United States Patent
Matsumoto et al.

(10) Patent No.: US 9,509,530 B2
(45) Date of Patent: Nov. 29, 2016

(54) COMMUNICATION SYSTEM AND COMMUNICATION TERMINAL

(75) Inventors: Tadashi Matsumoto, Osaka (JP); Shoji Koise, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1241 days.

(21) Appl. No.: 13/387,548

(22) PCT Filed: Jul. 28, 2010

(86) PCT No.: PCT/JP2010/062727
§ 371 (c)(1),
(2), (4) Date: Jun. 5, 2012

(87) PCT Pub. No.: WO2011/013716
PCT Pub. Date: Feb. 3, 2011

(65) Prior Publication Data
US 2012/0228927 A1    Sep. 13, 2012

(30) Foreign Application Priority Data
Jul. 28, 2009   (JP) .................................. 2009-175854

(51) Int. Cl.
*H04B 3/54*    (2006.01)
*H04L 25/02*   (2006.01)

(52) U.S. Cl.
CPC ........... *H04L 25/0294* (2013.01); *H04B 3/548* (2013.01); *H04B 2203/547* (2013.01); *H04L 25/0278* (2013.01)

(58) Field of Classification Search
CPC .. H04B 3/548; H04B 2203/547; H04B 3/02; H04B 3/50; H04L 25/0294; H04L 25/0278; H04L 25/00; H04L 25/66
USPC .................... 307/362, 250; 327/103, 268
See application file for complete search history.

(56) References Cited

U.S. PATENT DOCUMENTS 4,386,430 A * 5/1983 Treiber ............. H04L 25/03133
                                                        333/18
4,451,916 A * 5/1984 Casper ............... H04B 10/2504
                                                        370/226

(Continued)

FOREIGN PATENT DOCUMENTS

| JP | 54-40303 B | 12/1979 |
| JP | 54-40304 B | 12/1979 |

(Continued)

*Primary Examiner* — Rexford Barnie
*Assistant Examiner* — Elim Ortiz
(74) *Attorney, Agent, or Firm* — Greenblum & Bernstein, P.L.C.

(57) ABSTRACT

A transmitting circuit is connected to a communication line and configured to transmit a primary signal, being a current signal, to the communication line by changing a current flowing from a transmission unit via the communication line. A receiving circuit is configured to receive a secondary signal which is generated by converting the primary signal transmitted from the transmitting circuit to a voltage signal by a current/voltage converter provided between the transmission unit and the communication line. Specifically, the primary signal, being a current signal transmitted from a communication terminal, is converted to the secondary signal being a voltage signal by the current/voltage converter. As a result, communication can be performed even when the impedance of the communication line is reduced, facilitating introduction of a communication system.

12 Claims, 15 Drawing Sheets

(56) References Cited

U.S. PATENT DOCUMENTS

| | | | | |
|---|---|---|---|---|
| 4,573,786 A | * | 3/1986 | Taniguchi | G03B 7/16 396/159 |
| 4,633,217 A | * | 12/1986 | Akano | G08C 19/02 340/12.36 |
| 4,649,548 A | * | 3/1987 | Crane | H04L 12/40032 330/189 |
| 4,670,870 A | * | 6/1987 | Hewinson | H04B 1/585 370/285 |
| 4,757,530 A | * | 7/1988 | Arnon | H04B 3/03 379/403 |
| 4,856,023 A | * | 8/1989 | Singh | H04L 25/085 330/297 |
| 5,287,406 A | * | 2/1994 | Kakuishi | H04B 1/586 379/402 |
| 5,333,192 A | * | 7/1994 | McGinn | H04M 19/005 379/402 |
| 5,448,231 A | | 9/1995 | Takezoe et al. | |
| 5,734,703 A | * | 3/1998 | Hiyoshi | H04L 27/0002 379/399.01 |
| 5,920,609 A | * | 7/1999 | Toumani | H04M 3/303 370/244 |
| 6,281,829 B1 | * | 8/2001 | Amrany | H04L 27/0002 341/155 |
| 6,804,349 B1 | * | 10/2004 | Prat | H04B 3/23 379/390.04 |
| 6,917,682 B2 | | 7/2005 | Vanderbauwhede et al. | |
| 7,486,788 B2 | * | 2/2009 | Ferianz | H04B 3/23 379/345 |
| 7,864,718 B2 | * | 1/2011 | Huang | H04B 3/23 370/286 |
| 2001/0021250 A1 | | 9/2001 | Vanderbauwhede et al. | |
| 2004/0138786 A1 | * | 7/2004 | Blackett | G01D 4/00 700/295 |
| 2009/0243683 A1 | * | 10/2009 | Ochi | H03K 5/1534 327/171 |
| 2010/0295383 A1 | * | 11/2010 | Cummings | H01L 31/02021 307/151 |
| 2012/0099445 A1 | * | 4/2012 | Matsumoto | H04L 12/2602 370/252 |

FOREIGN PATENT DOCUMENTS

| | | |
|---|---|---|
| JP | 57-37264 B | 8/1982 |
| JP | 5-041709 | 2/1993 |
| JP | 08-274742 A | 10/1996 |
| JP | 2008-244882 A | 10/2008 |
| JP | 2008-244884 A | 10/2008 |
| KR | 10-2001-0062122 | 7/2001 |

* cited by examiner

COMMUNICATION SYSTEM AND COMMUNICATION TERMINAL

TECHNICAL FIELD

The present invention relates to a communication system including a plurality of communication terminals connected to a two-wire type communication line, and a power supply device that applies voltage between two wires of the communication line, and relates to a communication terminal.

BACKGROUND ART

Conventionally known communication system is that abase unit and a plurality of communication terminals (subbase units) are connected to a communication line (transmission line), to thereby perform communication between each communication terminal and the base unit. As an example of this kind of communication system, there is a system in which the base unit regularly monitors a state of the communication terminal, and when there is a change in the state of the communication terminal, a signal is transmitted from the base unit to other communication terminal so as to respond to the change of the state (see Japanese Patent Publication No. 1180690, Japanese Patent Publication No. 1195362, and Japanese Patent Publication No. 1144477). In this kind of communication system, for example when on/off state of a switch appended to the communication terminal is changed as the state change of the communication terminal, the base unit turns on/off an illumination apparatus and an air conditioner connected to other communication terminal, as a processing for responding to the state change. In this communication system, as shown in FIG. 25, communication terminals 1 don't perform communication directly but always perform communication via a base unit 2.

However, in the above-described structure, the communication terminals 1 always perform communication via the base unit 2, and therefore a communication speed is slow for performing polling by the base unit 2 directed to the communication terminals 1. Accordingly, the communication system with this structure is unsuitable for transmitting information with relatively large volume of data such as analog data (continuous data of electric energy). Further, in the communication system with this structure, an overall system is halted at the time of a failure, etc., of the base unit 2, thus involving a problem that reliability is low.

Meanwhile, there is also proposed a communication system configured to directly perform communication by communication terminals connected to a communication line in a peer-to-peer mode (called P2P hereafter), capable of transmitting the information with relatively large volume of data by improving the communication speed. Note that in this communication system, power is supplied to a plurality of communication terminals by one power feeder connected to the communication line.

The communication system of directly performing communication with communication terminals as described in the latter communication system, is desirable from a viewpoint of the communication speed and reliability. However, the former communication system in which communication is performed by the communication terminals 1 via the base unit 2 is widely spread. Therefore, in order to effectively utilize an already established communication system, the communication system as shown in FIG. 26 can be considered, which is the communication system of a coexistence of the former communication system, and the latter communication system capable of performing high-speed communication (see Japanese Patent Application Laid-Open No. H8-274742)

In the communication system of FIG. 26, a first communication terminal 1 performs communication via the base unit 2 by using a first protocol signal (voltage signal). Meanwhile, a second communication terminal 10 performs direct communication by using a second protocol signal (voltage signal) which is superimposed on the first protocol signal in a manner of synchronizing with the first protocol signal. The second protocol signal has a higher frequency than the frequency of the first protocol signal, and there is a difference in a signal level, etc., between the first protocol signal and the second protocol signal. Therefore, the first communication terminal 1 and the second communication terminal 10 cannot perform communication with each other, although they are connected to the same communication line 4.

Incidentally, in the aforementioned communication system, a plurality of terminals (base unit 2, first communication terminal 1, and second communication terminal 10) are connected to the two-wire type communication line 4. Therefore, an input impedance of each terminal is connected in parallel via the communication line 4. Accordingly, in order to perform communication by using the voltage signal (second protocol signal) between second communication terminals 10, the impedance of the terminal connected to the communication line 4 is required to be increased. However, the terminal with low impedance also exists in the already established terminals. Particularly, the base unit 2 also functions as a power supply and includes a smoothing capacitor in an output stage, thus showing relatively low impedance. Such a terminal is required to have high input impedance to a signal component, by connecting a high impedance module (not shown) between the terminal and the communication line 4, to thereby provide high impedance to the second protocol signal.

However, when the already established communication system is utilized, a contractor needs to connect the high impedance module between the terminal with low impedance of the aforementioned already established terminals, and the communication line 4, to thereby perform communication between the second communication terminals 10 by using the voltage signal. Therefore, when the second communication terminals 10 are introduced, the contractor needs to confirm a position of the already established terminal to perform a work of connecting the high impedance module. If the contractor forgets to connect the high impedance module, there is a possibility that the impedance of the communication line 4 is reduced, and the communication between the second communication terminals 10 is not established.

As described above, there is a problem in introducing the aforementioned communication system, such that it is time-consuming and laborious to examine a situation of a work site, thus imposing a large load on the contractor, and therefore the aforementioned communication system cannot be easily introduced.

SUMMARY OF THE INVENTION

In view of the above-described circumstance, the present invention is provided, and an object of the present invention is to provide a communication system and a communication terminal capable of performing communication even in a case of low impedance of a communication line, thereby facilitating introduction of this communication system.

A communication system of the present invention includes: a plurality of communication terminals connected to a two-wire communication line; a power supply device configured to apply voltage between two wires of the communication line; and a current/voltage converter configured to convert change of current on the communication line to change of voltage on the communication line by a voltage drop by a resistance component, the communication terminals each including: a transmitting circuit connected to the communication line and configured to generate a primary signal, being a current signal, on the communication line by changing a current flowing from the communication line; and a receiving circuit configured to receive a secondary signal which is generated by converting the primary signal to a voltage signal by the current/voltage converter.

According to the present invention, the signal from the transmitting circuit of the communication terminal is transmitted as the current signal, and the signal is received by the receiving circuit of the communication terminal as the voltage signal which is obtained by converting the current signal to the voltage signal by the current/voltage converter. Therefore, there is an advantage that introduction of the communication system is facilitated.

In this communication system, preferably characteristic impedance of the communication line is utilized as the resistance component by the current/voltage converter.

In this communication system, preferably a resistance element connected between the power supply device and the communication line is utilized as the resistance component by the current/voltage converter.

In this communication system, preferably an inductance element connected between the power supply device and the communication line is utilized as the resistance component by the current/voltage converter.

In this communication system, preferably the receiving circuit receives, as the secondary signal, the change of voltage which is generated on the communication line due to voltage drop when the current flowing from the communication line is changed by the transmitting circuit.

In this communication system, preferably the power supply device includes a signal transmitting section that transmits a first protocol signal, being a voltage signal, to the communication line by changing a magnitude of a voltage applied to the communication line, and the receiving circuit receives, as the secondary signal, a secondary protocol signal having a higher frequency than a frequency of the first protocol signal and superimposed on the first protocol signal.

In this communication system, further preferably the receiving circuit includes a comparator circuit that extracts a signal component of the secondary signal by binarizing the secondary signal by comparing the magnitude of the secondary signal with a predetermined threshold value, and when transmitting the primary signal from the transmitting circuit, the communication terminal sets input impedance viewed from the communication line to be low to suppress an amplitude of the secondary signal so that a component excluding the signal component of the secondary signal does not exceed the threshold value.

In this communication system, further preferably the receiving circuit includes an amplifier circuit configured to perform conversion to change of voltage from a first reference voltage by amplifying the secondary signal; and a comparator circuit configured to binarize the secondary signal by comparing an output of the amplifier circuit with a second reference voltage, the first reference voltage being set to be deviated from the second reference voltage.

In this communication system, further preferably the receiving circuit includes a comparator circuit configured to binarize the secondary signal by comparing a magnitude of the secondary signal with a predetermined threshold value; and a correction circuit configured to detect rising or falling of the secondary signal as a trigger, and correct the secondary signal to a square wave having a predetermined pulse width from a detection point of the trigger.

In this communication system, preferably the transmitting circuit includes an encoding section configured to encode transmission data such that a value not allowing the trigger to be generated is not continued in the secondary signal, and the receiving circuit includes a decoding section configured to decode the encoded data obtained from the secondary signal to acquire the transmission data.

The communication terminal of the present invention is used in a communication system that includes a power supply device configured to apply voltage between two wires of a communication line, and a current/voltage converter configured to convert change of current on the communication line to change of voltage on the communication line by a voltage drop by a resistance component, the communication terminal including a transmitting circuit connected to the communication line and configured to transmit a primary signal, being a current signal, to the communication line by changing a current flowing from the communication line; and a receiving circuit configured to receive a secondary signal which is generated by converting the primary signal to a voltage signal by the current/voltage converter.

BEST MODE FOR CARRYING OUT THE INVENTION

Figure 26:
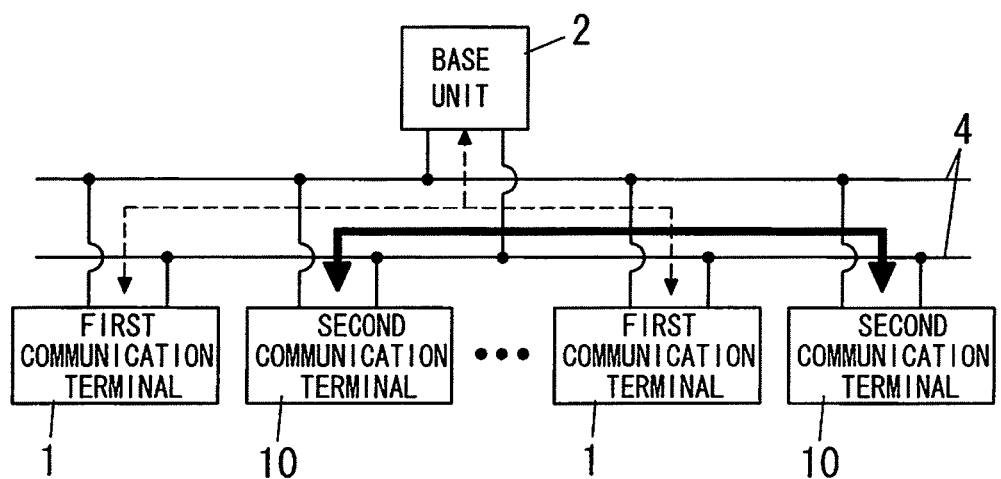
FIG. 26 is a schematic system block diagram showing other conventional example.

First, a basic structure of a communication system according to each embodiment will be described below. The communication system of the following embodiment is the communication system comprising a transmission unit (base unit) 2 connected to a two-wire type communication line 4 (see FIG. 26). For example a system such as NMAST (registered trademark) is given for example as this kind of communication system. This communication system comprises a plurality of (two in an example of the figure) first communication terminals 1, 1 connected to the communication line 4 and configured to communicate with the transmission unit 2; and a plurality of (two in the example of the figure) second communication terminals 10, 10 connected to the communication line 4 and configured to directly communicate with each other. In this communication system, communication is performed by using a first protocol signal transmitted through the communication line 4, and a second protocol signal superimposed on the first protocol signal. The second protocol signal has a higher frequency than the frequency of the first protocol signal.

A plurality of first communication terminals 1, 1 are connected in parallel to the transmission unit 2 by the communication line 4. A time-sharing multiplexing transmission system (called a "basic system" hereafter) is constructed by the transmission unit 2 and the first communication terminals 1, wherein data transmission to the communication terminals 1 from the transmission unit 2, and data transmission to the transmission unit 2 from the first communication terminals 1 are carried out by time-sharing.

In the basic system, the first communication terminals 1 are classified into two kinds of a monitoring terminal unit provided with a switch and a sensor, etc., (not shown), and a control terminal unit provided with a load (not shown). Thus, the load provided to the control terminal unit can be controlled according to first monitoring information from the switch and the sensor provided to the monitoring terminal unit. An address (identifier) is respectively assigned to the first communication terminal 1. When the first monitoring information is received, the monitoring terminal unit transmits control information corresponding to the first monitoring information, to the transmission unit 2. When the control information is received, the transmission unit 2 transmits the control information to the control terminal unit corresponding to the monitoring terminal unit based on the address. When the control information is received, the control terminal unit controls the load according to the control information. Since the control information for controlling the load reflects the first monitoring information, the first monitoring information is reflected on the control of the load by transmitting the control information through the communication line 4, although the transmission unit 2 is interposed between the monitoring terminal unit and the control terminal unit.

Subsequently, an operation of the basic system will be described.

Figure 2:
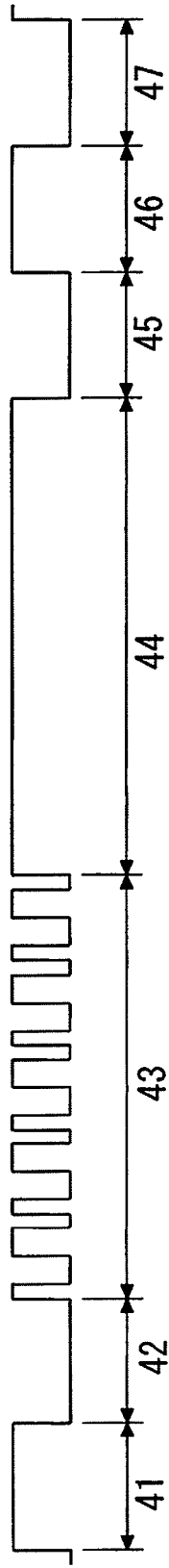
FIG. 2 is an explanatory view of a transmission signal format used in this system.

The transmission unit 2 transmits to the communication line 4, a transmission signal (first protocol signal) having a voltage waveform of a form as shown in FIG. 2. Namely, the transmission signal is a bipolar (±24 V) time-sharing multiplexing signal composed of an interruption pulse period 41, a spare period 42, a signal transmitting period 43, a signal returning period 44, an interruption pulse period 45, a short-circuit detecting period 46, and a spare region period 47. The interruption pulse period 41 is a period for detecting an interruption signal as will be described later, the spare period 42 is a period set corresponding to the interruption pulse period 45 and the short-circuit detecting period 46, and the signal transmitting period 43 is a period for transmitting data to the first communication terminal 1. The signal returning period 44 is a time slot for receiving a return signal from the first communication terminal 1, the interruption pulse period 45 is a period for detecting the interruption signal, and the short-circuit detecting period 46 is a period for detecting short-circuit. The spare region period 47 is a period for a case that processing cannot be carried out in time. The transmitting signal is a signal for transmitting data by modulating a carrier composed of a pulse train, by pulse width.

In each first communication terminal 1, when address data included in the signal transmission period 43 of the transmission signal received via the communication line 4, coincides with the address assigned to each first communication terminal 1, the control information for controlling the load is captured from the transmission signal. At this time, the first communication terminal 1 further returns the control information synchronously to the signal returning period 44 of the transmission signal, as a current mode signal (signal transmitted by short-circuiting the communication line 4 via a proper low impedance). Further, power of an internal circuit of the first communication terminal 1 is supplied by rectifying and stabilizing the transmission signal transmitted via the communication line 4.

Namely, the transmission unit 2 carries out regular polling by sequentially accessing the first communication terminals 1, 1, with address data changed cyclically, which is usually included in the transmission signal. During such a regular polling, if the control information is included in the transmission signal, the first communication terminal 1 with its self-address matched with the address data included in the transmission signal, is operated after capturing the control information, and returns a self-operation state to the transmission unit 2.

Meanwhile, when an interruption signal is received, which is generated in any one of the monitoring terminal units (first communication terminals 1) corresponding to the first monitoring information, the transmission unit 2 carries out interruption polling as well. In this interruption polling, the transmission unit 2 searches the first communication terminals 1 which generate the interruption signal, and thereafter accesses the first communication terminals 1, so that the control information responding to the first monitoring information is returned.

Namely, the transmission unit 2 carries out regular polling in which the transmission signal with address data changed cyclically is usually transmitted to the communication line 4. Further, when the interruption signal generated in the monitoring terminal units (first communication terminals 1) is detected synchronously to the interruption pulse period 41 or the interruption pulse period 45 of the transmission signal, the transmission unit 2 transmits the transmission signal having mode data set in an interruption polling mode. When a high-order bit of the address data of the transmission signal set in the interruption polling mode, coincides with the high-order bit of its self-address, the first communication terminal 1 that generates the interruption signal returns a low-order bit of its self-address as return data synchronously to the signal returning period 44 of the transmission signal. Thus, the address of the first communication terminal 1 that generates the interruption signal can be acquired by the transmission unit 2.

When the address of the first communication terminal 1 that generates the interruption signal, is acquired by the transmission unit 2, the transmission unit 2 transmits the transmission signal for requesting return of the control information, to the first communication terminal 1. Then the first communication terminal 1 returns the control information corresponding to the first monitoring information, to the transmission unit 2. When the control information is received, the transmission unit 2 gives an instruction to clear the first monitoring information of the corresponding first communication terminal 1, and the first monitoring information is cleared by the first communication terminal 1.

The transmission unit 2 that receives the control information, generates the control information transmitted to the first communication terminal (control terminal unit) 1 which is associated with the first communication terminal (monitoring terminal unit) 1, being an origin of this control information, based on the correlation of the address. The transmission unit 2 transmits the transmission signal including this control information to the communication line 4, and controls the load provided to the first communication terminals (control terminal units) 1.

In the aforementioned basic system, the first communication terminals (monitoring terminal unit, control terminal unit) 1 perform communication with, each other via the transmission unit 2, according to a protocol of a polling selecting system (called a first protocol hereafter).

Incidentally, in the aforementioned system, a plurality of second communication terminals 10, 10 are connected in parallel to each other via the communication line 4 so as to share the communication line 4 with the aforementioned basic system. Monitored equipment (not shown) for outputting second monitoring information transmitted between the second communication terminals 10, is connected to one of the second communication terminals 10, and a monitoring device (not shown) for acquiring the second monitoring information from the second communication terminal 10, is connected to the other second communication terminal 10.

Namely, the second communication terminal 10 performs communication (data transmission) via the communication line 4, and meanwhile the monitored equipment generates transmission data (second monitoring information), and the monitoring device processes received data. The second communication terminal 10 functions as an adaptor for converting data from the monitored equipment or the monitoring device connected to each second communication terminal 10, and transmitting it to the communication line 4. The monitored equipment and the monitoring device receive and transmit data from/to the second communication terminal 10 by regularly performing communication with each other. Note that a power measuring instrument for measuring power consumption of lighting equipment controlled by the basic system, can be considered as an example of the monitored equipment, and a meter reading device for displaying the power consumption measured by the power measuring instrument can be considered as an example of the monitoring device.

The second communication terminal 10 has a function of transmitting data (second monitoring information) to other second communication terminal 10 not through the transmission unit 2, based on a protocol different from the aforementioned first protocol (called a second protocol hereafter). There is a difference in the frequency and a signal level, etc., between the first protocol signal and the second protocol signal, and therefore although the first communication terminal 1 and the second communication terminal 10 are connected to the same communication line 4 and can share the communication line 4, they cannot perform communication with each other.

Specifically, the second communication terminal 10 superimposes a packet on the transmitting signal based on the second protocol, the packet including data to be transmitted to other second communication terminal 10, and transmits it to the communication line 4, and receives a second protocol packet transmitted by other second communication terminal 10. Namely, the first communication terminals 1 perform communication with each other based on the first protocol via the transmission unit 2 as described above, and meanwhile the second communication terminals 10 directly perform communication with each other based on the second protocol, and don't depend on the transmission unit 2. Therefore, the communication speed of the communication based on the second protocol can be faster than the communication speed of the communication based on the first protocol, and such a communication is used for the transmission of information with relatively large volume of data like analog data (continuous data of electric energy).

Further, the second communication terminal 10 monitors the transmission signal of the first protocol transmitted between the transmission unit 2 and the first communication terminal 1 of the basic system, and analyzes a data transmission state of the first protocol (called a state hereafter) from the monitored transmission signal. Further, the second communication terminal 10 has a function of judging whether or not the state is suitable for transmitting the second protocol packet, and transmitting the packet at a time when it is judged to be suitable for transmission.

Namely, the transmission signal obtained by performing pulse-width modulation of the carrier, the carrier being composed of a pulse train, is used in the first protocol which is used in the basic system. For superimposing the second protocol packet on this transmission signal, it is preferably superimposed on the transmission signal in a period when the transmission signal is stable in a high-level or in a low-level.

Here, the transmission signal employs a signal format as shown in FIG. 2. Therefore, although the spare period 42, the short-circuit detecting period 46, and the spare region period 47 can be considered to be the period suitable for transmitting the packet (called a communication suitable period hereafter), the other periods can be considered to be the periods not suitable for transmitting the packet (called a communication unsuitable period hereafter). Namely, the spare period 42, the short-circuit detecting period 46, and the spare region period 47 are suitable for transmitting the packet, because the time in which the transmission signal is stable in the high level or in the low level is relatively long. Other periods are unsuitable for transmitting the packet, because the time in which the transmission signal is stable in the high-level or in the low-level is relatively short, and because the packet is easily affected by the transmission of the signal based on the first protocol (interruption signal and return data) between the transmission unit 2 and the first communication terminal 1. Further, rising and falling periods of the transmission signal can also be regarded as the communication unsuitable periods because of an influence of a harmonic noise and an influence of a transient response due to voltage inversion of the signal.

Therefore, the second communication terminal 10 is configured to analyze the state of the transmission signal, judge whether the state is the communication suitable period or the communication unsuitable period based on its analysis result (state of the transmission signal), and transmit the second protocol packet only when it is so judged that the state is the communication suitable period. Thus, by superimposing the second protocol packet on the transmission signal synchronously to the first protocol transmission signal, interference between the communication of the first protocol and the communication of the second protocol using the common communication line 4, can be prevented. When data cannot be completely transmitted in one communication suitable period due to large volume of data of the transmission data, the second communication terminal 10 suspends the communication at the end of the communication suitable period, and transmits remained data in the next communication suitable period.

Note that power can be supplied to each section of the second communication terminal 10 by a method of supplying power by rectifying and stabilizing the transmission signal transmitted via the communication line 4 from the transmission unit 2 similarly to the method in the first communication terminal 1 of the basic system (intensive feeding method). However, the method of supplying power to each section of the second communication terminal 10 is not limited in this configuration, and the power may be supplied by a method by rectifying and stabilizing a commercial power supply (local feeding method).

Embodiment 1

The communication system of this embodiment is characterized in the communication between the second communication terminals 10, 10 in the aforementioned communication system. The structure and the function of the first communication terminal 1 are based on the basic structure described above, and therefore explanation for the first communication terminal 1 is omitted hereafter, and the second communication terminal 10 is simply expressed as "communication terminal 10" hereafter in the explanation.

Figure 1:
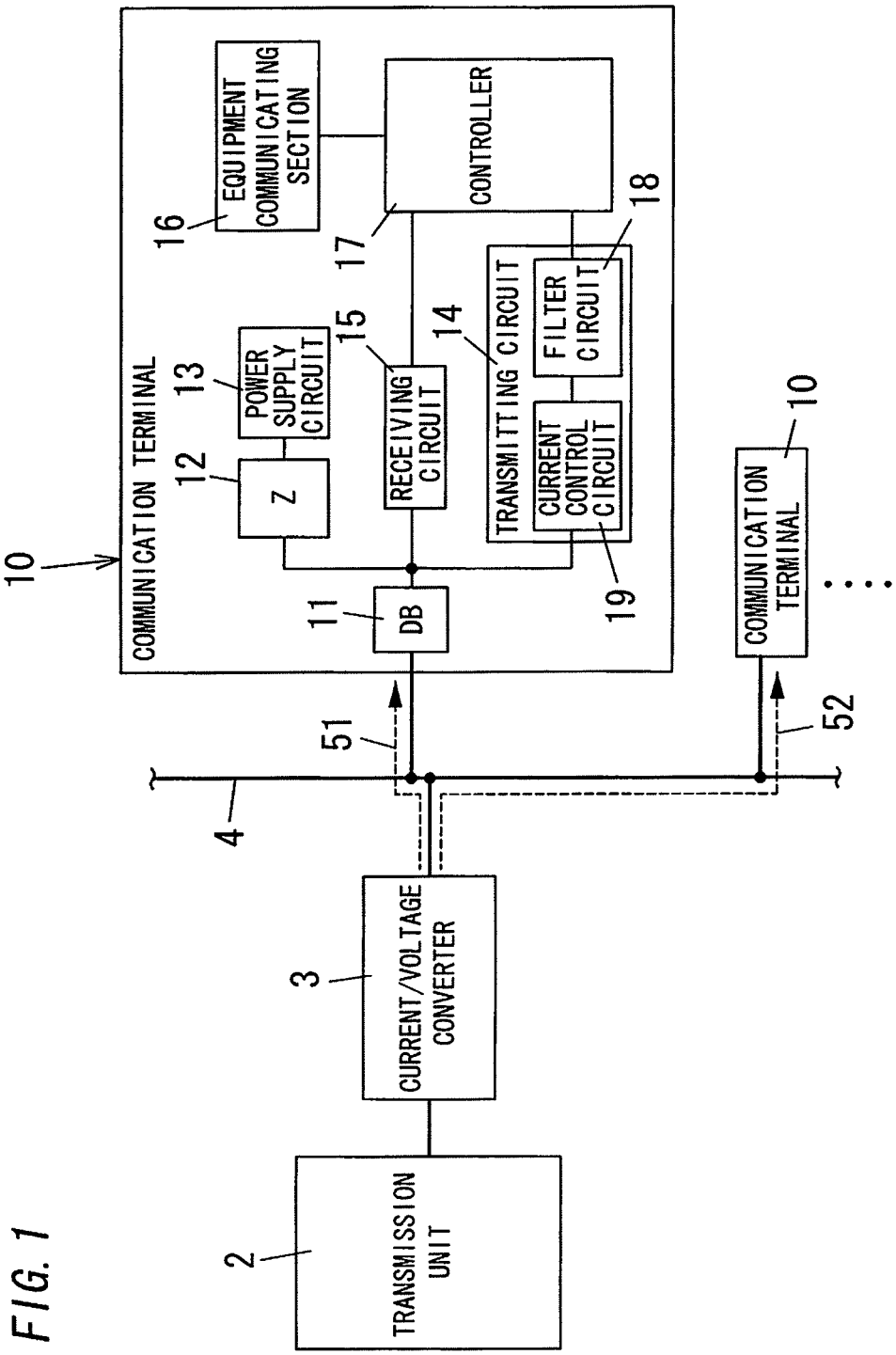
FIG. 1 is a schematic system block diagram showing a structure of Embodiment 1.

In the communication system of this embodiment, as shown in FIG. 1, a current/voltage converter 3 for converting change of current on the communication line 4 to change of voltage on the communication line 4, is provided between the transmission unit 2 and the communication line 4. The transmission unit 2 functions as a power supply device for applying voltage (transmission signal here) between two wires of the communication line 4.

The communication terminal 10 includes a rectifier 11 composed of a diode bridge for rectifying the transmission signal transmitted from the transmission unit 2 via the communication line 4, and a power supply circuit 13 connected to an output of the rectifier 11 via an impedance circuit 12, and generates an internal power supply by the power supply circuit 13. Further, the communication terminal 10 includes a transmitting circuit 14 for transmitting the second protocol signal, a receiving circuit 15 for receiving the second protocol signal, an equipment communicating section 16 for performing communication with the monitored equipment and the monitoring device, and a controller 17 for controlling an operation of each section. Note that the rectifier 11 is used for supplying power, and also eliminates polarities of the signal.

The controller 17 is mainly composed of a microcomputer, and outputs a square wave transmission signal to the transmitting circuit 14, and inputs a square wave received signal from the receiving circuit 15. The controller 17 has a function of transmitting data (second monitoring information) acquired by the equipment communicating section 16 from the monitored equipment, to other communication terminal 10 from the transmitting circuit 14, and outputting the data acquired by the receiving circuit 15 from other communication terminal 10, to the monitoring device from the equipment communicating section 16.

The transmitting circuit 14 is connected to the communication line 4 and is configured to transmit a primary signal 51, being a current signal, to the communication line 4, by changing the current which flows from the communication line 4. Further, the receiving circuit 15 is configured to receive a secondary signal 52, being a signal obtained by converting the primary signal 51 transmitted from the transmitting circuit 14 to a voltage signal by the current/voltage converter 3. Namely, the primary signal 51, being the current signal, transmitted from the communication terminal 10 is converted to the secondary signal 52, being the voltage signal, by the current/voltage converter 3.

Next, specific structures of the current/voltage converter 3 and the transmitting circuit 14 will be described, with reference to FIG. 3.

The current/voltage converter 3 is composed of resistance elements R11, R12 inserted between an output end of the transmission unit 2 and the communication line 4. The resistance elements R11, R12 may be inserted with respect to at least one wire of the two-wire type communication line 4. In this embodiment, they are inserted for two wires together, and resistance values of both resistance elements R11, R12 are set to same values. With this structure, the current/voltage converter 3 converts change of current on the communication line 4 to change of voltage on the communication line 4 by voltage drop by the resistance elements R11, R12. Accordingly, the amplitude of the secondary signal 52 is changed by resistance values of the resistance elements R11, R12 connected between the transmission unit 2 and the communication line 4. Therefore, an adjustment of improving a transmission quality can be carried out by changing a setting of the resistance values of the resistance elements R11, R12.

However, actually the characteristic impedance of the communication line 4 itself also plays an important role as a resistance component of current/voltage converter for converting change of current on the communication line 4 to change of voltage on the communication line 4. Namely, when the primary signal 51, being the current signal, is transmitted to the communication line 4 by the communication terminal 10, the resistance component including the communication line 4 itself that exists between the communication terminal 10 and the transmission unit 2, being the power supply device, functions as the current/voltage converter, to thereby convert the primary signal 51 to the secondary signal 52. Further, not only the characteristic impedance of the communication line 4, but also all of the resistance components that exist between the transmitting side communication terminal 10 and the power supply device, such as output impedance of the transmission unit 2, can be used as the current/voltage converter.

Therefore, even when the resistance component such as characteristic impedance of the communication line 4 and output impedance of the transmission unit 2 is used as the current/voltage converter without newly providing the resistance elements R11, R12, the communication system with the same operation as this embodiment can be realized. Namely, the current/voltage converter utilizes the characteristic impedance of the communication line 4 and the output impedance of the transmission unit 2, etc., as the resistance component, there is no necessity for newly adding the current/voltage converter on the communication line 4, thus making it possible to suppress the constitutional elements of the communication system to be small.

Thus, in consideration of the characteristic impedance of the communication line 4, etc., even when the resistance elements R11, R12 are provided, the resistance values of the resistance elements R11, R12 can be sufficiently small (for example, 4.7Ω). In this case, the resistance elements R11, R12 function as an impedance regulating section for regulating an impedance of the transmission unit 2 viewed from the connection line 4. However, when the characteristic impedance of the communication line 4 is used as the current/voltage converter as described above, a distributed constant circuit needs to be taken into consideration, thus complicating the explanation. Therefore, in order to simplify the explanation hereafter, the system is considered as a lumped constant circuit with resistance elements R11, R12 used as the current/voltage converter 3.

Figure 3:
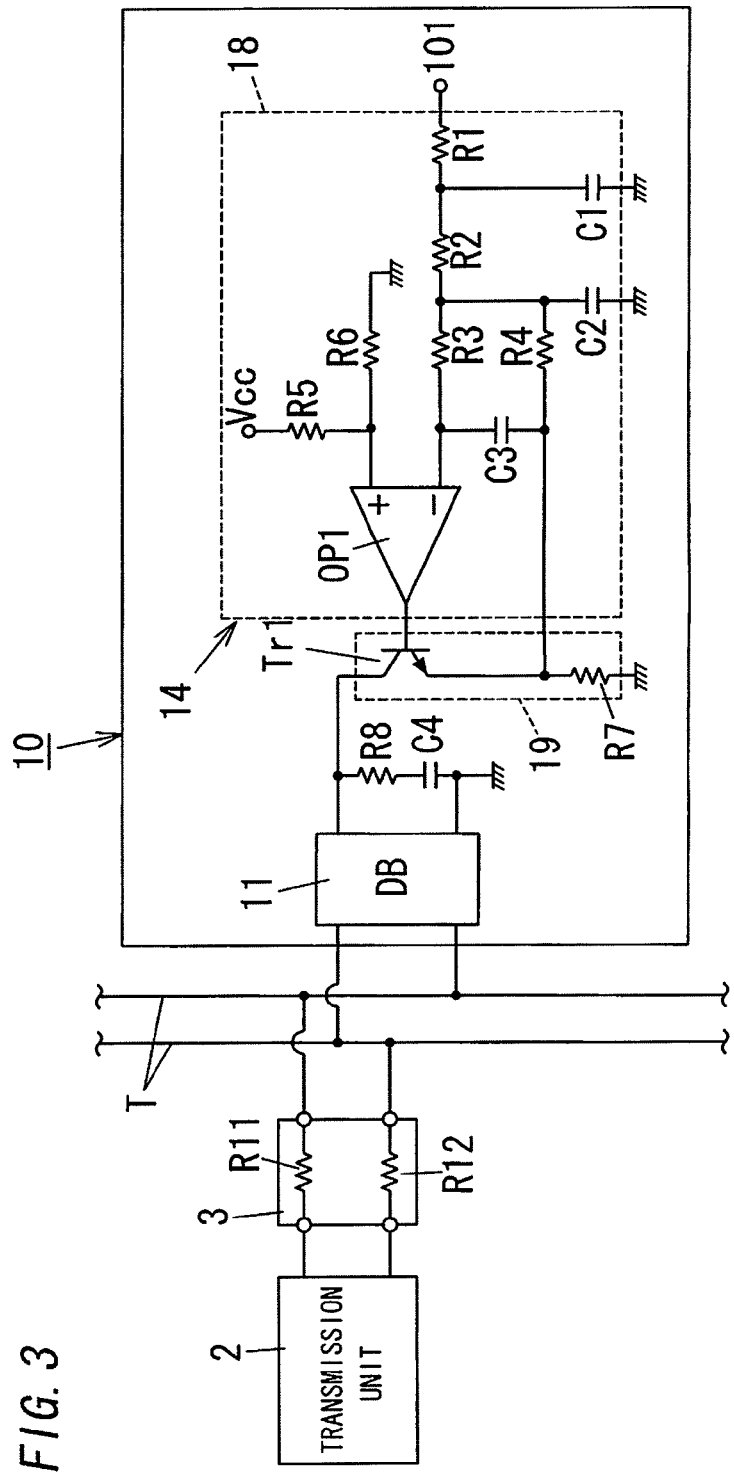
FIG. 3 is a schematic circuit view showing an essential part of this system.

As shown in FIG. 3, the transmitting circuit 14 includes a filter circuit 18 connected to an input end 101 and configured to convert a square wave transmission signal (voltage signal) input from the input end 101, to a sinusoidal voltage signal, and includes a current control circuit 19 connected to an output of the filter circuit 18. The input end 101 is connected to the controller 17.

In an example of FIG. 3, the filter circuit 18 is an active filter using an operational amplifier OP1 in which a reference voltage is applied to the non-inverting input terminal. The filter circuit 18 includes resistance R1, resistance R2, and resistance R3 sequentially connected in series from input end 101 side, between the input end 101 and the inverting input terminal of the operational amplifier OP1, and a capacitor C1 with one end connected to a contact point of resistance R1 and resistance R2, and the other end grounded. Further, the filter circuit 18 includes a capacitor C2 with one end connected to a contact point of resistance R2 and resistance R3, and the other end grounded, and a series circuit of the resistance R4 and the capacitor C3 which is connected between the contact point of the resistance R2 and resistance R3 and the inverting input terminal of the operational amplifier OP1. Further, a reference voltage obtained by dividing constant voltage Vcc by the series circuit of resistances R5, R6, is input into the non-inverting input terminal of the operational amplifier OP1.

With this structure, the filter circuit 18 has a function as a low-pass filter and an inverting amplifier circuit, and when the square wave voltage signal is input, this voltage signal is converted to the sinusoidal voltage signal with polarity inverted, which is then output.

The current control circuit 19 includes NPN-type transistor Tr1 with the collector connected to the communication line 4 via the rectifier 11. In the transistor Tr1, the emitter is grounded via resistance R7, and the base is connected to the output end of the filter circuit 18 (output end of the operational amplifier OP1). The emitter of the transistor Tr1 is connected to the contact point of resistance R4 and capacitor C3, to thereby form a feedback path of the operational amplifier OP1. Thus, the feedback of the operational amplifier OP1 is not directly taken from the output terminal of the operational amplifier OP1, but is taken from the emitter of the transistor Tr1, so that feedback can be given in consideration of the temperature characteristic and voltage drop of the transistor Tr1. Thus, there is an advantage that the followability of the current signal (primary signal 51) can be improved.

With this structure, when the transmission signal, being the square wave voltage signal, is input into the input end 101 of the filter circuit 18, the sinusoidal voltage signal appears on the output end of the filter circuit 18 (output terminal of the operational amplifier OP1). At this time, in the current control circuit 19, the magnitude of the current flowing through the transistor Tr1 is changed according to an output voltage level of the filter circuit 18, and therefore the magnitude of the current drawn into the communication terminal 10 from the communication line 4, is changed. As a result, the current signal (primary signal 51) corresponding to the voltage signal output by the filter circuit 18 is generated on the communication line 4. Namely, it is the same thing that the transmitting circuit 14 generates the primary signal 51, being the current signal, on the communication line 4 by changing the current flowing from the communication line 4, and that the transmitting circuit 14 transmits the primary signal 51 to the communication line 4 by changing the current flowing from the communication line 4.

The primary signal 51 thus transmitted (generated) on the communication line 4 by the transmitting circuit 14, is converted to the voltage signal by voltage drop by the current/voltage converter 3. In other words, the transmitting circuit 14 generates the change of voltage (voltage signal) on the communication line 4 by voltage drop by changing the current flowing from the communication line 4, and such a change of voltage is received by the receiving circuit 15 as the secondary signal 52.

Figure 4:
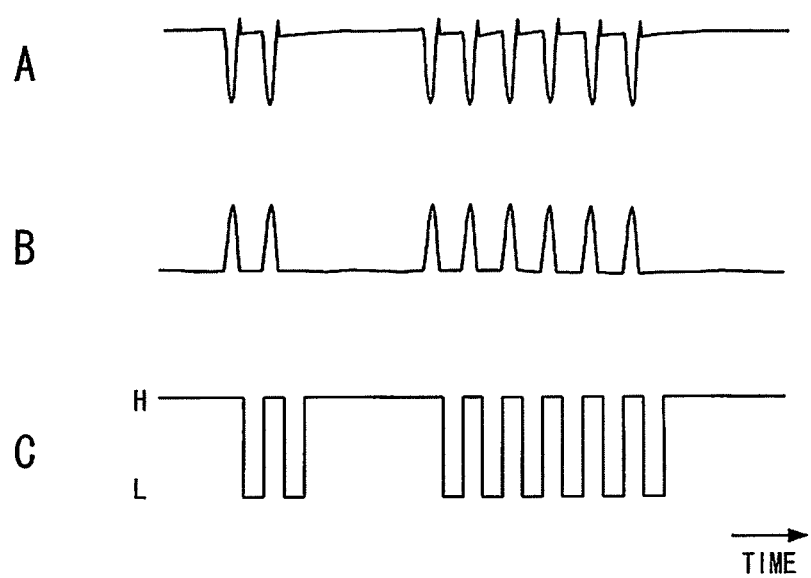
FIG. 4 is a waveform chart showing an operation of a transmitting circuit of this system.

Namely, when a certain square wave transmission signal is input into the filter circuit 18 from the controller 17, the voltage signal as shown in FIG. 4B is generated on the output end of the filter circuit 18, and the current flowing through the current control circuit 19 is changed. At this time, the primary signal 51, being the current signal, generated on the communication line 4 is converted to the secondary signal 52 being the voltage signal with polarity inverted as shown in FIG. 4A, by the current/voltage converter 3. Note that FIG. 4C shows the data received by the receiving circuit 15.

As shown in FIG. 3, the series circuit of resistance R8 and capacitor C4 is connected between connection ends to the transmitting circuit 14 of the rectifier 11.

Subsequently, a specific structure of the receiving circuit 15 will be described, with reference to FIG. 5.

The receiving circuit 15 includes an amplifier circuit 21 connected to the output of the rectifier 11 via the capacitor C20, a comparator circuit 22 connected to the output of the amplifier circuit 21, and a correction circuit 23 connected to the output of the comparator circuit 22. An output end 102 of the correction circuit 23 is connected to the controller 17.

Figure 5:
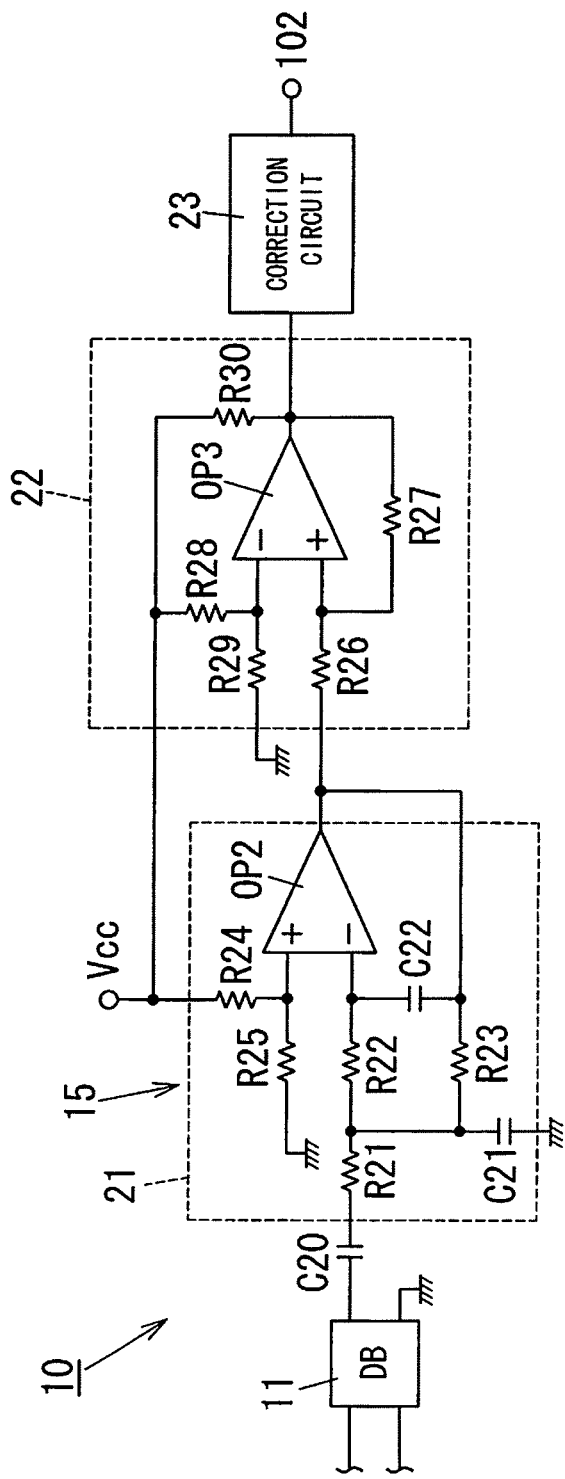
FIG. 5 is a schematic circuit view showing a structure of a receiving circuit of this system.

In an example of FIG. 5, the amplifier circuit 21 is an active filter using an operational amplifier OP2 in which a reference voltage is applied to the non-inverting input terminal. The amplifier circuit 21 includes resistance R21 and resistance R22 connected in series sequentially from the input end side between the input end and the inverting input terminal of the operational amplifier OP2, and capacitor C21 with one end connected to a contact point of resistance R21 and resistance R22 and the other end grounded. Further, the amplifier circuit 21 includes resistance R23 connected between the contact point of resistance R21 and resistance R22, and the output terminal of the operational amplifier OP2, and a capacitor C22 connected between the inverting input terminal and the output terminal of the operational amplifier OP2. Further, the reference voltage obtained by dividing the constant voltage Vcc by the series circuit of resistances R24, R25, is input into the non-inverting input terminal of the operational amplifier OP2.

With this structure, the amplifier circuit 21 has a function as the inverting amplifier circuit, and when the voltage signal is input, the voltage signal is converted to the voltage signal with polarity inverted, which is then output.

The comparator circuit 22 includes an operational amplifier OP3 in which a reference voltage is applied to the non-inverting input terminal. The comparator circuit 22 further includes resistance R26 connected between the output of the amplifier circuit 21 (output terminal of the operational amplifier OP2) and the non-inverting input terminal of the operational amplifier OP3, and resistance R27 connected between the inverting input terminal and the output terminal of the operational amplifier OP3. Further, the reference voltage obtained by dividing the constant voltage Vcc by the series circuit of resistances R28, R29 is input into the inverting input terminal of the operational amplifier OP3, and resistance R30 is connected between the constant voltage Vcc and the output terminal of the operational amplifier OP3.

As will be described in detail later, the correction circuit 23 is the circuit for outputting the received signal, being the square wave voltage signal, to the controller 17 by correcting a signal waveform output from the comparator circuit 22.

With this structure, when the secondary signal 52, being the voltage signal, is generated on the communication line 4, the voltage signal, being the signal showing the change of voltage of the secondary signal 52 with a reference voltage as a reference, appears on the output end of the amplifier circuit 21 (output terminal of the operational amplifier OP2). At this time, the comparator circuit 22 binarizes the secondary signal 52 by comparing the voltage signal output by the amplifier circuit 21 and the reference voltage of the operational amplifier OP3. The secondary signal 52 thus binarized, is output to the controller 17 from the output end 102 as the received signal, with its waveform corrected by the correction circuit 23.

Figure 6:
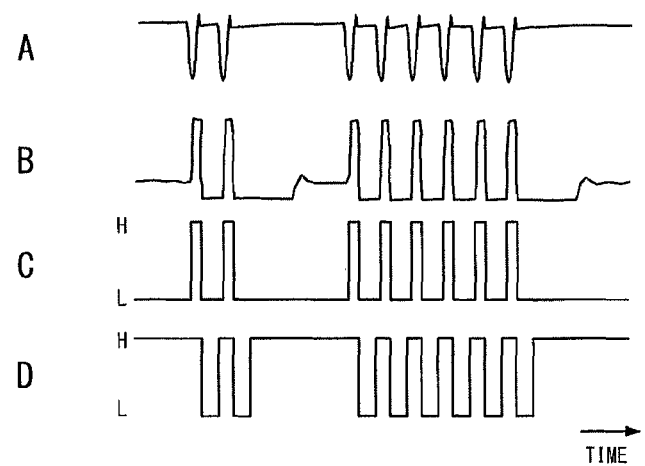
FIG. 6 is a waveform chart showing the operation of the receiving circuit of this system.

Namely, when the secondary signal 52 shown in FIG. 6A is input from the communication line 4, the output voltage of the amplifier circuit 21 is changed according to the change of voltage of the secondary signal 52 as shown in FIG. 6B. At this time, the output voltage of the amplifier circuit 21 is binarized by the comparator circuit 22, to generate a signal as shown in FIG. 6C in the output of the comparator circuit 22, and further by correcting the waveform by the correction circuit 23, the square waveform received signal as shown in FIG. 6D is output to the controller 17.

A baseband transmission system is used in the communication of the communication terminals 10. The baseband transmission system is a system for transmitting a pulse signal corresponding to two values of "1" and "0" as DC binary coding without modulating the signal. Further, a single-flow RZ (return to zero) system is employed as a signal system here, and a combination of the "L-level" and the "H-level" in the transmission signal and the received signal is set to "1", and a combination of the "H-level" and the "H-level" is set to "0".

According to the communication system of this embodiment described above, the signal transmitting side communication terminal 10 transmits the signal to the communication line 4 in the form of the primary signal 51, being the current signal, and then the primary signal 51 is converted to the voltage signal by the current/voltage converter 3. Thus, the signal receiving side communication terminal 10 receives the secondary signal 52, being the voltage signal. Namely, although the communication is performed between the communication terminals 10, when focusing on the secondary signal 52, the communication is performed between the current/voltage converter (actually including the characteristic impedance of the communication line 4 as described above) 3 which is the origin of the secondary signal 52, and the receiving side communication terminal 10.

Accordingly, because of providing the current/voltage converter 3 between the communication terminals 10 and 10, a communication distance between the communication terminals 10, 10 can be extended while securing a high transmission quality. Thus, in the aforementioned communication system, the communication can be performed between the communication terminals 10 and 10 which are relatively away from each other, by suppressing a distance between the current/voltage converter 3 and the receiving side communication terminal 10 even when the apparent communication distance between the communication terminals 10, 10 is increased.

Figure 7:
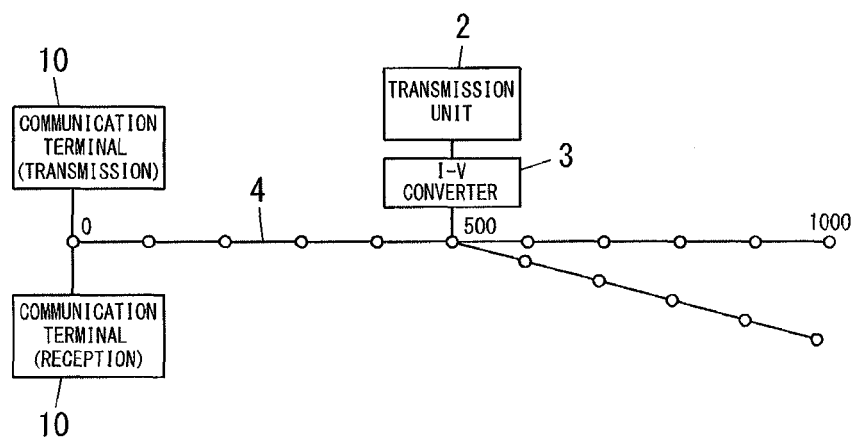
FIG. 7 is a schematic system block diagram showing a positional relation of a communication terminal of this system.

When specifically described, it is confirmed that the following result can be obtained by using the aforementioned communication system. Here, the following case as shown in FIG. 7 is assumed. Namely, using a communication line 4 having a total length of 1000 [m], the transmission unit 2 is connected to the communication line 4 at a position (intermediate position) of 500 [m] from one end thereof via the current/voltage converter 3, and a installation position of the receiving side communication terminal 10 on the communication line 4 is gradually changed. Note that in an example of FIG. 7, the communication line 4 is forked into two branches from its center position.

Figure 8:
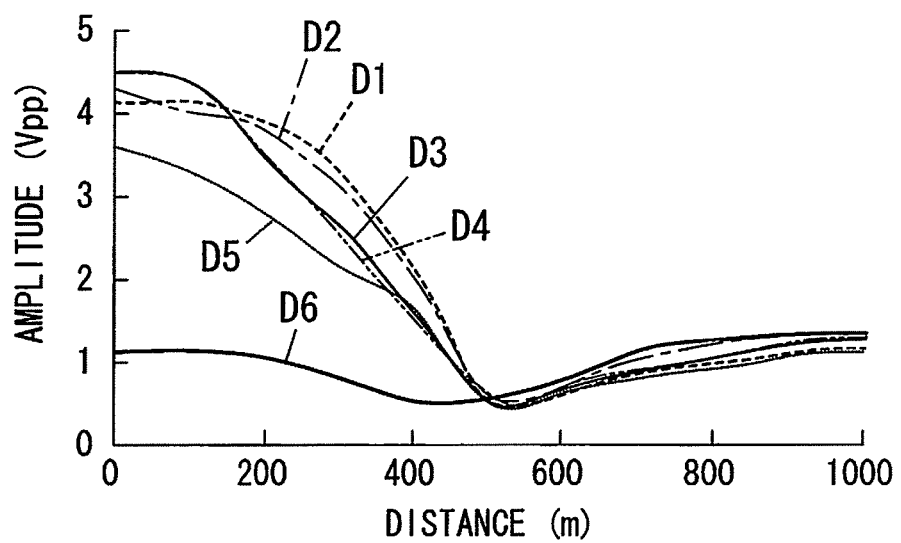
FIG. 8 is a graph showing amplitude of a received signal of this system.

FIG. 8 shows the amplitudes (peak to peak) of the secondary signals 52 in the receiving side communication terminal 10, in a case that the distance from said one end of the communication line 4 to the transmitting side communication terminal 10 is changed sequentially from 0, 100, 200, 300, 400, and 500 [m]. In FIG. 8, "D1" shows an amplitude when the distance from said one end of the communication line 4 to the transmitting side communication terminal 10 is 0 [m], "D2" is an amplitude when the distance is 100 [m], "D3" is an amplitude when the distance is 200 [m], "D4" is an amplitude when the distance is 300 [m], "D5" is an amplitude when the distance is 400 [m], and "D6" is an amplitude when the distance is 500 [m]. In FIG. 8, the horizontal axis indicates the distance from said one end of the communication line 4 to the receiving side communication terminal 10, and the vertical axis indicates the amplitude of the secondary signal 52.

As is clarified from FIG. 8, by using the communication system of this embodiment, the receiving side communication terminal 10 can receive the secondary signal 52 having sufficient amplitude, irrespective of the installation position of the communication terminal 10 on the communication line 4. For example, even in a case that the transmitting side communication terminal 10 is set on said one end of the communication line 4, the transmitting side communication terminal 10 is set on the other end of the communication line 4, and the communication distance is set to 1000 [m], the secondary signal 52 has the sufficient amplitude exceeding 1 [Vpp].

Further, under the same condition of FIG. 8, when the position of the transmitting side communication terminal 10 was changed in a range of 0 to 500 [m] from said one end of the communication line 4, and the position of the receiving side communication terminal 10 was changed in a range of 0 to 1000 [m] from one end of the communication line 4, it was confirmed that communication error was not generated at either position. Specifically, it was confirmed that when transmitting the data of the 1000 packets from the transmitting side communication terminal 10, the data of all 1000 packets could be received by the receiving side communication terminal 10, irrespective of the positions of the communication terminals 10. Thus, the communication distance between the communication terminals 10 can be extended while securing a high transmission quality, by using the aforementioned communication system.

Figure 9:
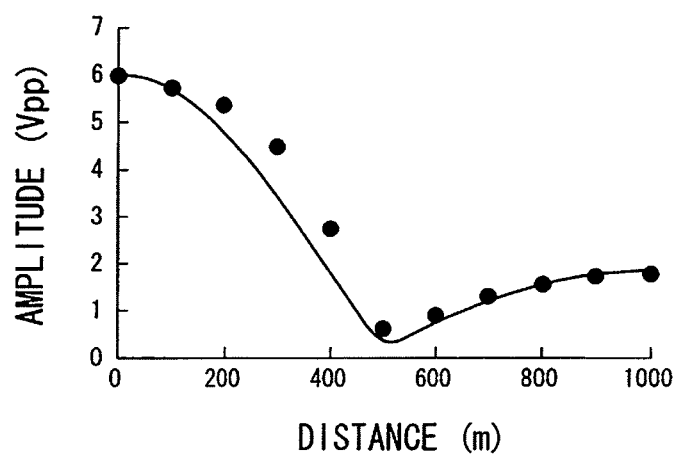
FIG. 9 is a graph showing the amplitude of the received signal of this system.

Further, FIG. 9 shows the amplitude of the secondary signal 52 received by the receiving side communication terminal 10, when the transmitting side communication terminal 10 is set on said one end of the communication line 4 and the position of the receiving side communication terminal 10 is changed, in the structure of FIG. 7. Here, it shows results when the resistance values of the resistance elements R11, R12 that constitute the current/voltage converter 3, are set to 4.7Ω. Note that in FIG. 9, the horizontal axis indicates the distance from said one end of the communication line 4 to the receiving side communication terminal 10, and the vertical axis indicates the amplitude of the secondary signal 52, and actually measured values are shown by black circles, and analytic values are shown by solid line.

As is clarified from FIG. 9, in the aforementioned communication system, the communication between the communication terminals 10 is enabled, even when the input impedance of the transmission unit 2 is set to be low. Thus, a structure which hardly allows the noise to be generated can be achieved by setting low input impedance of the transmission unit 2. Namely, transmission of the primary signal 51 is enabled even in a case of low line impedance of the communication line 4, by using the current signal as the primary signal 51 transmitted from the communication terminal 10.

Accordingly, when the communication terminal 10 is introduced, the contractor is not required to perform a work of confirming the position of the already established terminal (transmission unit 2, first communication terminal 1) when connecting a high impedance module, and it is sufficient to simply connect the communication terminal 10 to the communication line 4. Therefore, the load of an installation operation of the communication terminal 10 can be tremendously reduced.

As described above, according to the aforementioned communication system, there is an advantage that labor of examining a situation of a work site and confirming the communication distance can be reduced, thus reducing the load of the contractor, and introduction of the communication system can be facilitated.

Incidentally, in the communication system with the aforementioned structure, in a case of a long communication line 4, the amplitude of the voltage signal (secondary signal 52) generated on the communication line 4 becomes large, and accordingly a transient response generated by RC component on the communication line 4 becomes also large. Therefore, there is a possibility that communication error is generated due to the voltage change caused by the transient response.

Figure 10:
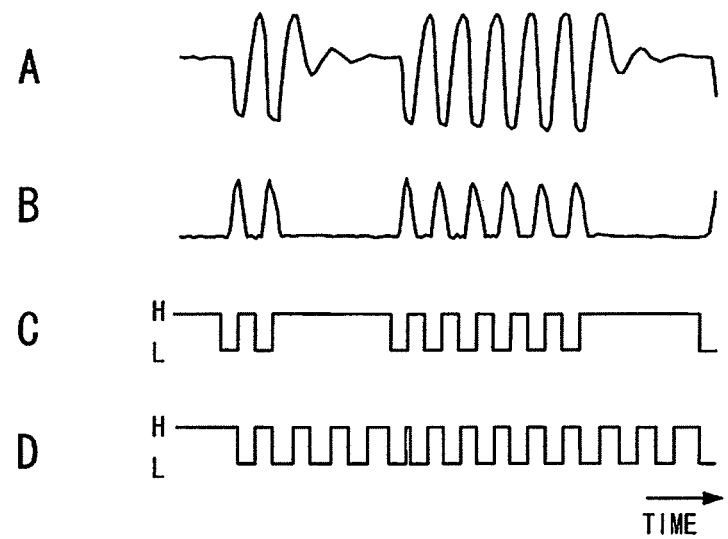
FIG. 10 is a waveform chart showing the operation of a comparative example of this system.

For example, when the square wave transmission signal shown in FIG. 10C is input into the transmitting circuit 14 from the controller 17, the current flowing to the transmitting circuit (current control circuit 19) 14 is changed as shown in FIG. 10B. At this time, the current signal (primary signal 51) generated on the communication line 4 is converted to the voltage signal by the current/voltage converter 3, to thereby generate the change of voltage on the communication line 4 as shown in FIG. 10A. Therefore, the receiving side communication terminal 10 receives the secondary signal 52, being the voltage signal shown in FIG. 10A. However, since the amplitude of the secondary signal 52 is large, in the receiving circuit 15, an unwanted component (transient response component) which is not the signal component corresponding to the transmission signal also exceeds the reference voltage (threshold value) of the comparator circuit 22, and the received signal including the unwanted component as shown in FIG. 10D is obtained. After all, the received signal includes the unwanted component due to the change of voltage caused by the transient response, and therefore the received signal does not become identical to the transmitting signal, thus generating the communication error. Note that FIG. 10B shows the output voltage of the operational amplifier OP1 that reflects the current flowing through the transistor Tr1.

Therefore, in this embodiment, the communication terminal 10 has a structure of reducing the input impedance viewed from the communication line 4 when transmitting the primary signal 51 to the communication line 4 from the transmitting circuit 14, thereby prevents the amplitude of the secondary signal 52 generated on the communication line 4 from becoming unnecessarily large. Specifically, the series circuit of resistance R8 and capacitor C4 connected between connection ends for the transmitting circuit 14 of the rectifier 11 is configured so that they can be separated from each other, and the series circuit is connected only when the primary signal 51 is transmitted from the transmitting circuit 14, to thereby reduce the impedance compared with the impedance of other period. During reception by the receiving circuit 14, for the purpose that the secondary signal 52 generated on the communication line 4 can be received, the series circuit is separated so as to have a predetermined impedance to the secondary signal 52. Switching of the impedance is realized using a semiconductor switch, etc., that can be controlled by the controller 17.

Figure 11:
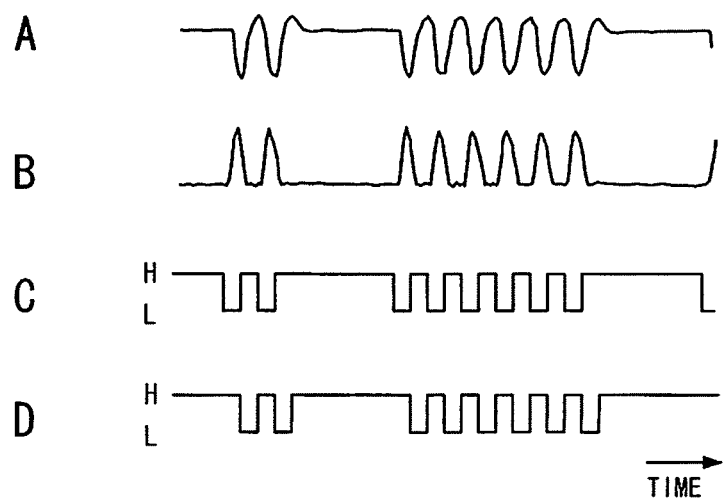
FIG. 11 is a waveform chart showing the operation of this system.

As described above, by reducing the input impedance of the communication terminal 10 when the primary signal 51 is transmitted, the amplitude of the secondary signal 52 does not become unnecessarily large as shown in FIG. 11A, and the change of voltage by transient response can be suppressed to be small. As a result, in the receiving side communication terminal 10, as shown in FIG. 11D, the received signal not including the unwanted component due to the transient response can be output to the controller 17 from the receiving circuit 15, and therefore the communication error can be reduced. The transmitting signal is shown in FIG. 11C, and the output voltage of the operational amplifier OP1 reflecting the current flowing through the transmitting circuit 14 is shown in FIG. 11B.

Further, in the receiving circuit 15, the reference voltage (first reference voltage) of the amplifier circuit 21 is set to be deviated from the reference voltage (second reference voltage) of the comparator circuit 22, so that the unwanted component due to the change of voltage by transient response is not included in the received signal.

Figure 12:
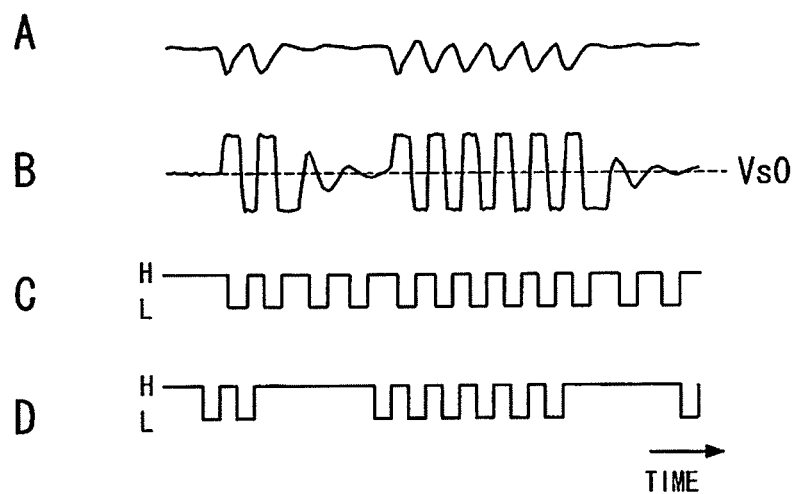
FIG. 12 is a waveform chart showing the operation of the comparative example of this system.

Namely, the voltage signal changed according to the change of voltage of the secondary signal 52 with the reference voltage as a reference, is output from the amplifier circuit 21. Therefore, if the reference voltage of the amplifier circuit 21 and the reference voltage of the comparator circuit 22 are set to the same values, there is a possibility that the unwanted component due to transient response is also included in the received signal. For example, when the square wave transmission signal shown in FIG. 12D is input into the transmitting circuit 14 from the controller 17, the current signal (primary signal 51) generated on the communication line 4, is converted to the voltage signal by the current/voltage converter 3, thus generating the change of voltage on the communication line 4 as shown in FIG. 12A. At this time, in the receiving side communication terminal 10, the secondary signal 52, being the voltage signal shown in FIG. 12A is received, and as shown in FIG. 12B, the output of the amplifier circuit 21 is changed according to the change of voltage of the secondary signal 52, with the reference voltage Vs0 of the comparator circuit 22 as a reference. Therefore, the received signal output to the controller 17 from the receiving circuit 15 includes the unwanted component due to the change of voltage caused by transient response as shown in FIG. 12C, and therefore the received signal does not correspond to the transmitting signal, resulting in the communication error.

Figure 13:
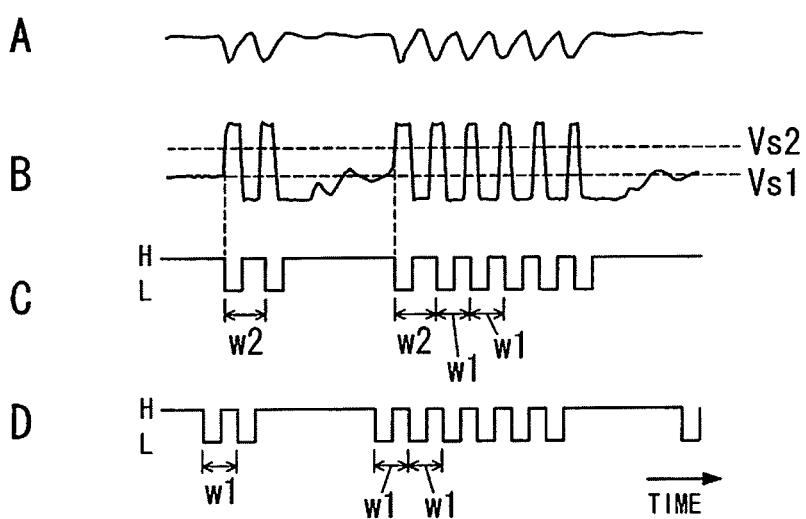
FIG. 13 is a waveform chart showing the operation of other comparative example of this system.

Meanwhile, in this embodiment, by differentiating the resistance values of resistance R24 and resistance R28 of the receiving circuit 15, the reference voltage of the amplifier 21 is set to be lower than the reference voltage of the comparator circuit 22. Thus, as shown in FIG. 13B, the output of the amplifier circuit 21 is changed according to the change of voltage of the secondary signal 52, with reference voltage Vs1 as a reference, which is lower than the reference voltage Vs2 of the comparator circuit. Therefore, in the comparator circuit 22, the unwanted component caused by transient response can be removed, and as shown in FIG. 13C, the unwanted component caused by transient response can be prevented from being included in the received signal output to the controller 17 from the receiving circuit 15, and therefore the communication error can be reduced. The transmitting signal is shown in FIG. 13D, and the secondary signal 52 is shown in FIG. 13A.

A function of the correction circuit 23 provided in the receiving circuit 15 will be described next.

Namely, in the receiving circuit 15, the secondary signal 52 is sometimes received in such a manner as being deviated from a regular waveform caused by distortion of current waves and a phase lag, which results in deterioration of the transmission quality. Therefore, in this embodiment, the communication error is reduced by correcting a time width (pulse width) of the signal output from the comparator circuit 22, to a fixed value by the correction circuit 23.

The correction circuit 23 is configured to detect the rising or falling of the secondary signal 52 as a trigger, and correct the secondary signal 52 in a square wave having a predetermined pulse width from a detection time point of the trigger. The pulse width of the signal after correction, is determined using a timer function (one shot timer) of a microcomputer of the controller 17 for example.

However, the transient response is generated relatively large at a start of the flow of the current to the transmitting circuit 14, and therefore the pulse width of a leading pulse is sometimes larger than the following pulse, in the output of the amplifier circuit 21. Namely, the pulse width of the output of the amplifier circuit 21 is not constant as shown in FIG. 13B, and therefore variation is sometimes generated in the pulse width in the signal after correction as shown in FIG. 13C, by using the falling of the secondary signal 52 (rising of the output of the amplifier circuit 21) as a trigger. In an example of FIG. 13C, time width w2 of the leading 1 bit showing the value of "1" is larger than time width w1 of the following 1 bit.

Figure 14:
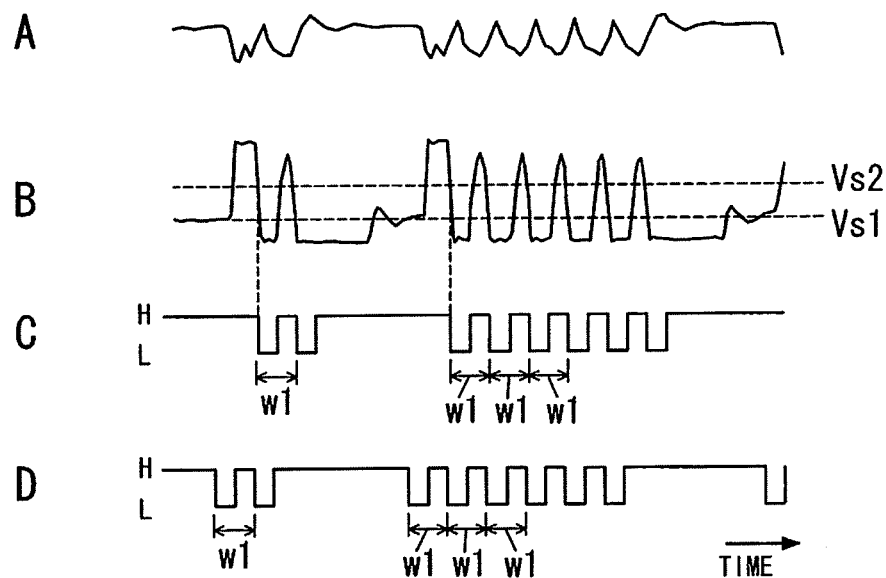
FIG. 14 is a waveform chart showing the operation of this system.

Therefore, preferably the correction circuit 23 employs a structure of detecting the rising of the secondary signal 52 (falling of the output of the amplifier circuit 21) as a trigger. Thus, even when there is a variation in the pulse width of the output of the amplifier circuit 21 as shown in FIG. 14B, time width w1 of 1 bit can be fixed to an approximately constant value in the signal after correction as shown in FIG. 14C. The transmission signal is shown in FIG. 14D, and the secondary signal 52 is shown in FIG. 14A.

Thus, even in a case that distortion is generated in the secondary signal 52 in a time axial direction under an influence of transient response, the communication error can be suppressed by correcting this distortion, in such a way that the secondary signal 52 is corrected to the square wave with a predetermined pulse width.

Note that according to this embodiment, in the transmitting circuit 14, the current signal (primary signal 51) of the transmitting signal, with polarity inverted, output from the controller 17, is drawn into the communication terminal 10 from the communication line 4 by using the filter circuit 18 having a function as an inverting amplifier circuit. However, the embodiment is not limited thereto, and for example the current signal (primary signal 51) with the same polarity as the polarity of the transmission signal output from the controller 17, may also be drawn into the communication terminal 10 from the communication line 4, by using the filter circuit 18 as the non-inverting amplifier circuit for example. In this case, a direction of the change of voltage generated by the change of current of the primary signal 51 is reversed by the current/voltage converter 3. Therefore, the voltage generated between communication lines 4 is increased when transmitting the primary signal 51. With this structure, although power consumption is increased during standby, compared with the aforementioned embodiment, the power consumption during transmitting the signal can be reduced. Further, similar operation can be obtained even if the polarity itself of the transmission signal output from the controller 17 is inverted, without changing the structure of the transmitting circuit 14.

Further, specific circuits such as filter circuit 18, amplifier circuit 21, and comparator circuit 22 shown in FIG. 3 and FIG. 5 are simply examples, and an equivalent function can be realized by other circuit structure as well.

Embodiment 2

The communication system of this embodiment is different from the communication system of Embodiment 1, in a point that an encoding section (not shown) for encoding transmission data received/transmitted between the communication terminals 10 is provided in the transmitting circuit 14, and a decoding section (not shown) for decoding data and acquiring the transmission data is provided in the receiving circuit 15.

Namely, the receiving circuit 15 detects the rising of the secondary signal 52 by the correction circuit 23 as a trigger, and corrects the pulse width. Therefore, in the receiving circuit 15, when the value ("0" here) not generating the rising in the secondary signal 52 is continued, the trigger is not detected in the correction circuit 23, which may result in the deterioration of the transmission quality. Therefore, in this embodiment, continuance of value "0" in the secondary signal 52 is prevented by encoding the transmission data by the encoding section. Note that value "1" generates rising, and therefore there is no influence on the transmission quality even if the value "1" is continued.

When specifically explained, the encoding section divides the transmission data into data sequences for each of the 5 bits, and converts each data sequence to the data sequence of 8 bits in which value "0" is not continued. A table used for converting the data sequence as shown in table 1 is previously registered in the communication terminal 10, and the encoding section converts the data sequence using this table. The data sequence of 8 bits ("1" to "32" of table 1) assigned to each data sequence of 5 bits (there are 32 different data sequences) is stored in the table. Further, a start code showing a start of transmitting data ("Start code" of table 1) STX and a stop code showing an end of transmitting data ("End code" of table 1) ETX are stored in the table.

Figure 15:
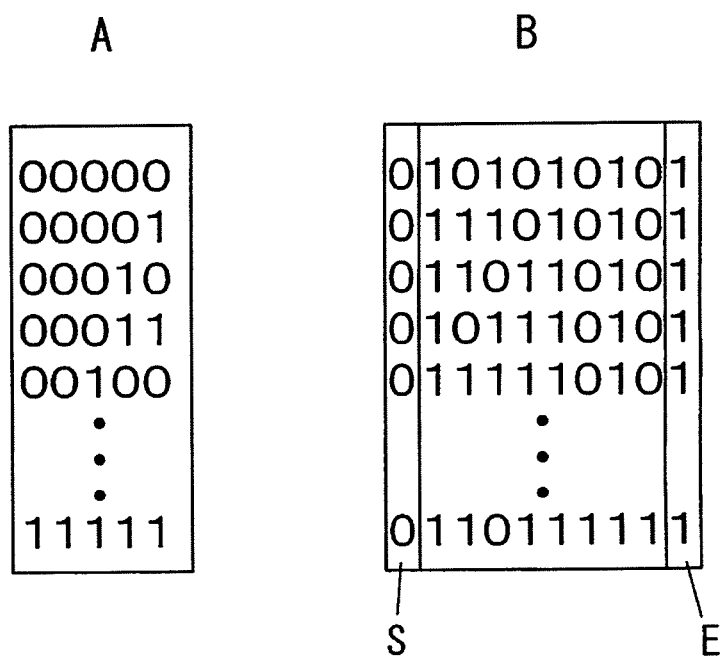
FIG. 15 is an explanatory view of the operation of Embodiment 2.

Namely, both values of "0xFD" and "0xFF" are used not as data but as the start code STX and the stop code ETX of a specific code, so as to obtain a clear division of packets. Further, "0" as start bit S, and "1" as stop bit E, are respectively assigned to before and after each data sequence of 8 bits. Accordingly, finally, data sequence of 5 bits as shown in FIG. 15A is converted to the data sequence of 10 bits as shown in FIG. 15B respectively. Note that in table 1, the data sequence after conversion is also expressed by hexadecimal notation.

TABLE 1

| | Before conversion | | | | | After conversion | | | | | | | | | Hexadecimal |
|---|---|---|---|---|---|---|---|---|---|---|---|---|---|---|---|
| | | | | | | S | 0 | 1 | 2 | 3 | 4 | 5 | 6 | 7 | E | |
| 1 | 0 | 0 | 0 | 0 | 0 | 0 | 1 | 0 | 1 | 0 | 1 | 0 | 1 | 0 | 1 | 0x55 |
| 2 | 0 | 0 | 0 | 0 | 1 | 0 | 1 | 1 | 1 | 0 | 1 | 0 | 1 | 0 | 1 | 0x57 |
| 3 | 0 | 0 | 0 | 1 | 0 | 0 | 1 | 1 | 0 | 1 | 1 | 0 | 1 | 0 | 1 | 0x5B |
| 4 | 0 | 0 | 0 | 1 | 1 | 0 | 1 | 0 | 1 | 1 | 1 | 0 | 1 | 0 | 1 | 0x5D |
| 5 | 0 | 0 | 1 | 0 | 0 | 0 | 1 | 1 | 1 | 1 | 1 | 0 | 1 | 0 | 1 | 0x5F |
| 6 | 0 | 0 | 1 | 0 | 1 | 0 | 1 | 1 | 0 | 1 | 0 | 1 | 1 | 0 | 1 | 0x6B |
| 7 | 0 | 0 | 1 | 1 | 0 | 0 | 1 | 0 | 1 | 1 | 0 | 1 | 1 | 0 | 1 | 0x6D |
| 8 | 0 | 0 | 1 | 1 | 1 | 0 | 1 | 1 | 1 | 1 | 0 | 1 | 1 | 0 | 1 | 0x6F |
| 9 | 0 | 1 | 0 | 0 | 0 | 0 | 1 | 0 | 1 | 0 | 1 | 1 | 1 | 0 | 1 | 0x75 |
| 10 | 0 | 1 | 0 | 0 | 1 | 0 | 1 | 1 | 1 | 0 | 1 | 1 | 1 | 0 | 1 | 0x77 |
| 11 | 0 | 1 | 0 | 1 | 0 | 0 | 1 | 1 | 0 | 1 | 1 | 1 | 1 | 0 | 1 | 0x7B |
| 12 | 0 | 1 | 0 | 1 | 1 | 0 | 1 | 0 | 1 | 1 | 1 | 1 | 1 | 0 | 1 | 0x7D |
| 13 | 0 | 1 | 1 | 0 | 0 | 0 | 1 | 1 | 1 | 1 | 1 | 1 | 1 | 0 | 1 | 0x7F |
| 14 | 0 | 1 | 1 | 0 | 1 | 0 | 1 | 1 | 0 | 1 | 0 | 1 | 0 | 1 | 1 | 0xAB |
| 15 | 0 | 1 | 1 | 1 | 0 | 0 | 1 | 0 | 1 | 1 | 0 | 1 | 0 | 1 | 1 | 0xAD |
| 16 | 0 | 1 | 1 | 1 | 1 | 0 | 1 | 1 | 1 | 1 | 0 | 1 | 0 | 1 | 1 | 0xAF |
| 17 | 1 | 0 | 0 | 0 | 0 | 0 | 1 | 0 | 1 | 0 | 1 | 1 | 0 | 1 | 1 | 0xB5 |
| 18 | 1 | 0 | 0 | 0 | 1 | 0 | 1 | 1 | 1 | 0 | 1 | 1 | 0 | 1 | 1 | 0xB7 |
| 19 | 1 | 0 | 0 | 1 | 0 | 0 | 1 | 1 | 0 | 1 | 1 | 1 | 0 | 1 | 1 | 0xBB |
| 20 | 1 | 0 | 0 | 1 | 1 | 0 | 1 | 0 | 1 | 1 | 1 | 1 | 0 | 1 | 1 | 0xBD |
| 21 | 1 | 0 | 1 | 0 | 0 | 0 | 1 | 1 | 1 | 1 | 1 | 1 | 0 | 1 | 1 | 0xBF |
| 22 | 1 | 0 | 1 | 0 | 1 | 0 | 1 | 0 | 1 | 0 | 1 | 0 | 1 | 1 | 1 | 0xD5 |
| 23 | 1 | 0 | 1 | 1 | 0 | 0 | 1 | 1 | 1 | 0 | 1 | 0 | 1 | 1 | 1 | 0xD7 |
| 24 | 1 | 0 | 1 | 1 | 1 | 0 | 1 | 1 | 0 | 1 | 1 | 0 | 1 | 1 | 1 | 0xDB |
| 25 | 1 | 1 | 0 | 0 | 0 | 0 | 1 | 0 | 1 | 1 | 1 | 0 | 1 | 1 | 1 | 0xDD |
| 26 | 1 | 1 | 0 | 0 | 1 | 0 | 1 | 1 | 1 | 1 | 1 | 0 | 1 | 1 | 1 | 0xDF |
| 27 | 1 | 1 | 0 | 1 | 0 | 0 | 1 | 1 | 1 | 0 | 1 | 1 | 1 | 1 | 1 | 0xEB |
| 28 | 1 | 1 | 0 | 1 | 1 | 0 | 1 | 0 | 1 | 1 | 0 | 1 | 1 | 1 | 1 | 0xED |
| 29 | 1 | 1 | 1 | 0 | 0 | 0 | 1 | 1 | 1 | 1 | 0 | 1 | 1 | 1 | 1 | 0xEF |
| 30 | 1 | 1 | 1 | 0 | 1 | 0 | 1 | 0 | 1 | 0 | 1 | 1 | 1 | 1 | 1 | 0xF5 |
| 31 | 1 | 1 | 1 | 1 | 0 | 0 | 1 | 1 | 1 | 0 | 1 | 1 | 1 | 1 | 1 | 0xF7 |
| 32 | 1 | 1 | 1 | 1 | 1 | 0 | 1 | 1 | 0 | 1 | 1 | 1 | 1 | 1 | 1 | 0xFB |
| Start cord | | | | | | 0 | 1 | 0 | 1 | 1 | 1 | 1 | 1 | 1 | 1 | 0xFD |
| End cord | | | | | | 0 | 1 | 1 | 1 | 1 | 1 | 1 | 1 | 1 | 1 | 0xFF |

The decoding section decodes the data sequence of 8 bits converted by the encoding section based on the table of table 1, by inversely converting it to the data sequence of 5 bits. Thus, the transmission data before encoding can be acquired by the receiving circuit 15, from the encoded data.

Figure 16:
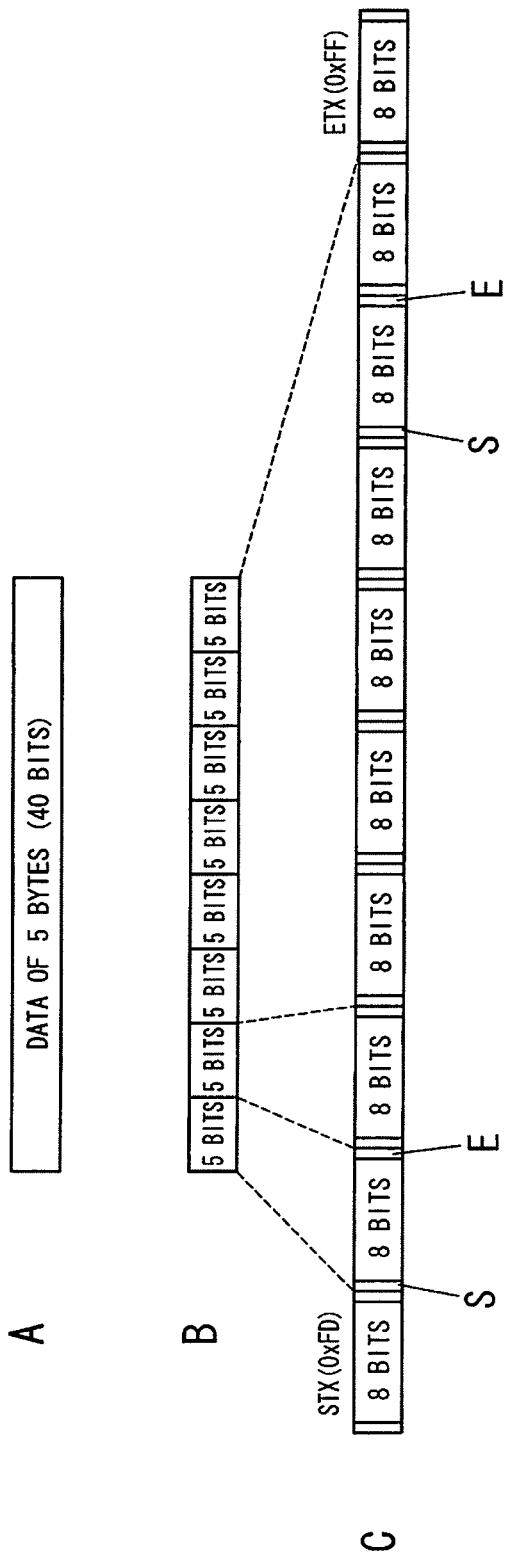
FIG. 16 is an explanatory view of the operation of this system.

When a specific example is given, as shown in FIG. 16A, when the transmission data of 5 bytes (40 bits) is transmitted as shown in FIG. 16A, first, the encoding section divides the transmission data into eight data sequences of 5 bits unit as shown in FIG. 16B. Subsequently, the encoding section converts each data sequence to the data sequence of 8 bits based on the table of table 1. Further, the encoding section converts each data sequence to ten data sequences of 8 bits in total (10 bits including start bit and stop bit) as shown in FIG. 16C, by adding start code STX and stop code ETX to before and after transmission data. Therefore, when the transmission data of 5 bytes is transmitted during 1 ms, data of 100 bits in total (=10 bits×10) is transmitted.

When a data transmitting speed of UART (Universal Asynchronous Receiver Transmitter) is set to 156.25 kbps, 6.4 μs is required for transmitting data of 1 bit, and therefore 640 µs is required for transmitting data of 100 bits. Note that the communication suitable period of 1 ms per 1 period (15 ms) exists at three places in the transmission signal used for the communication between the transmission unit 2 and the first communication terminals 1. Therefore, when the transmission data of 5 bytes is transmitted with no conversion, the data transmitting speed of 800 bps (=3/15 [ms]×40 [bits]) is sufficient.

According to the structure of this embodiment described above, the value not generating the trigger in the secondary signal 52 is not continued by encoding the transmission data, and the encoded transmission data is transmitted. Accordingly, there is an advantage that the secondary signal 52 can be surely corrected by the correction circuit 23, and the reliability of the communication can be improved.

Figure 17:
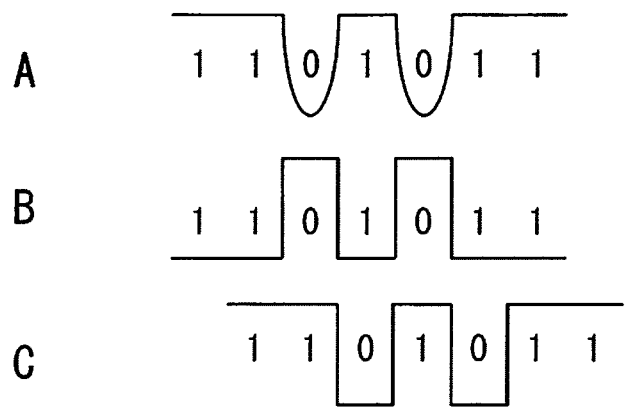
FIG. 17 is an explanatory view of the operation of this system.

A specific operation of this embodiment will be described. For example, when data of "1101011" is transmitted, regularly the receiving circuit 15 receives the secondary signal 52 shown in FIG. 17A, and generates the signal as shown in FIG. 17B in the output of the comparator circuit 22. Thus, the signal after being corrected by the correction circuit 23 becomes the signal corresponding to the transmission data "1101011" as shown in FIG. 17C.

Figure 18:
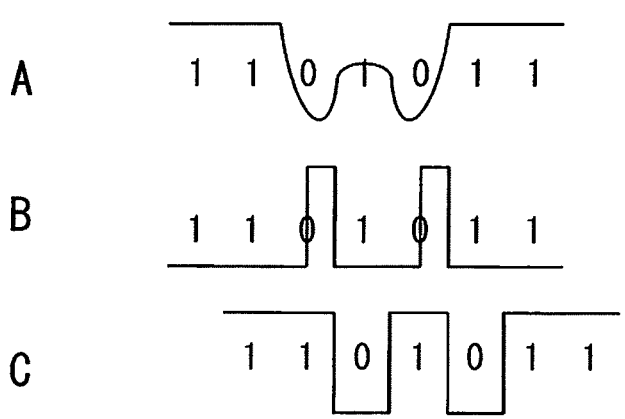
FIG. 18 is an explanatory view of the operation of this system.

Further, when the distortion is generated in the secondary signal 52 as shown in FIG. 18A, the receiving circuit 15 sometimes generates the signal with no constant pulse width as shown in FIG. 18B, in the output of the comparator circuit 22. In this case as well, the signal after being corrected by the correction circuit 23, becomes the signal corresponding to the transmission data "1101011" as shown in FIG. 18C.

Figure 19:
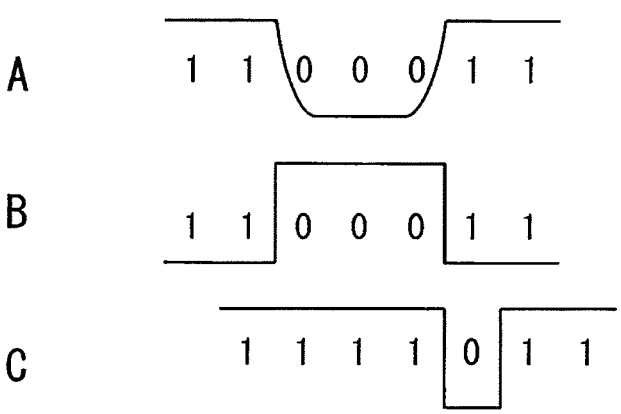
FIG. 19 is an explanatory view of the operation of the comparative example of this system.

Meanwhile, if data of "1100011" is transmitted and the secondary signal 52 is received wherein the value ("0" here) not generating rising as shown in FIG. 19A is continued, the receiving circuit 15 generates the signal as shown in FIG. 19B in the output of the comparator circuit 22. In this case, the trigger is effected only in the last "0" of the correction circuit 23 in a part where "0" is continued in the output of the comparator circuit 22, and therefore the signal after correction shows "1111011" as shown in FIG. 19C, which is different from the transmission data "1100011", and the communication error is thereby caused.

In the structure of this embodiment, by encoding the transmission data and transmitting the encoded transmission data, there is no continuance of the value not generating the trigger in the secondary signal 52. Therefore, the communication error as shown in FIG. 19C can be avoided.

The other structure and function are similar to those of Embodiment 1.

Incidentally, the aforementioned each embodiment shows an example of applying voltage to the communication line 4 by transmitting the transmitting signal, being the voltage signal, by the transmission unit 2. However, the embodiment is not limited thereto, and a power supply device for applying constant DC voltage to the communication line 4 may be provided instead of the transmission unit 2. In this case, the communication terminal 10 performs communication with other communication terminal 10 by transmitting, to the communication line 4, the packet including data to be transmitted to other communication terminal 10, by superimposing it on the DC voltage based on the second protocol. In this case, the data transmitting speed of UART is 78.125 kbps, which is half of the aforementioned 156.25 kbps.

Figure 20:
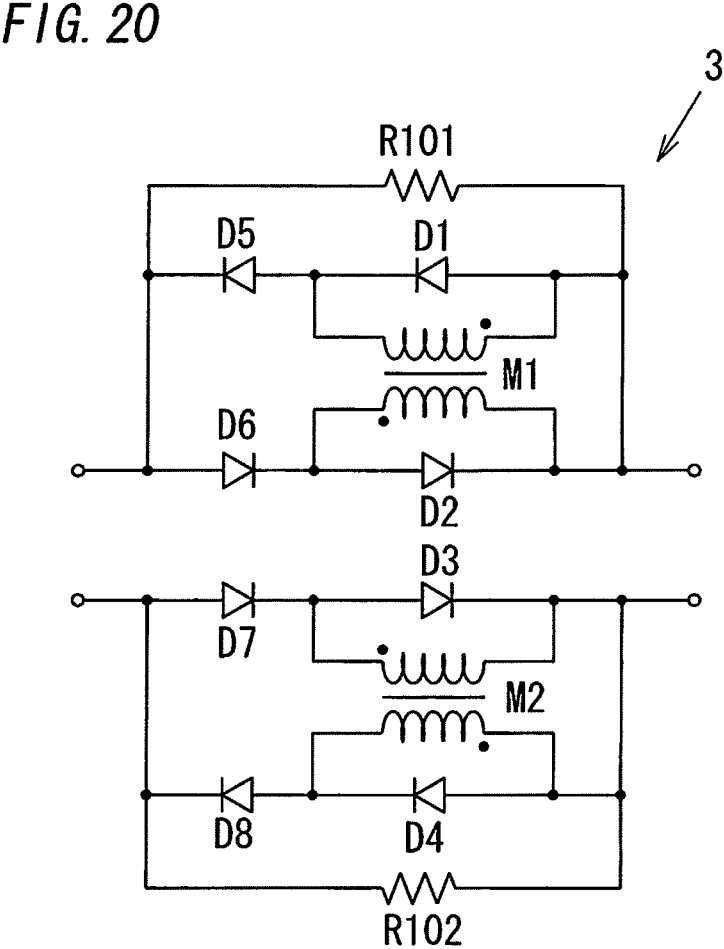
FIG. 20 is a schematic block diagram showing other example of a current/voltage converter.
Figure 21:
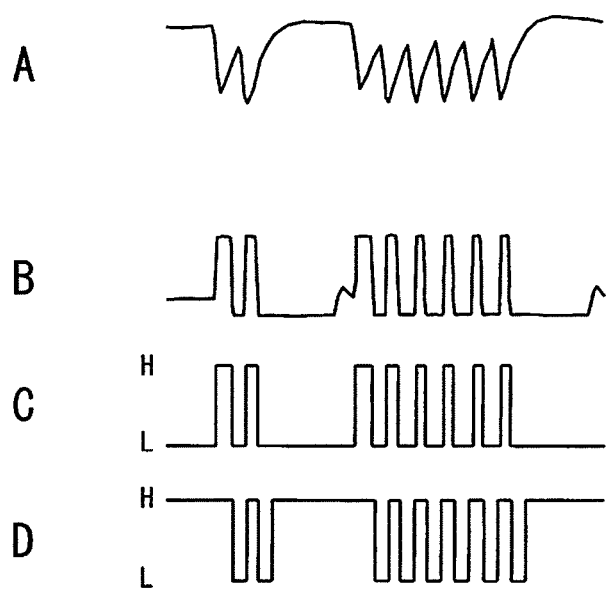
FIG. 21 is a waveform chart showing an operation example of the receiving circuit in embodiments 1 and 2.
Figure 22:
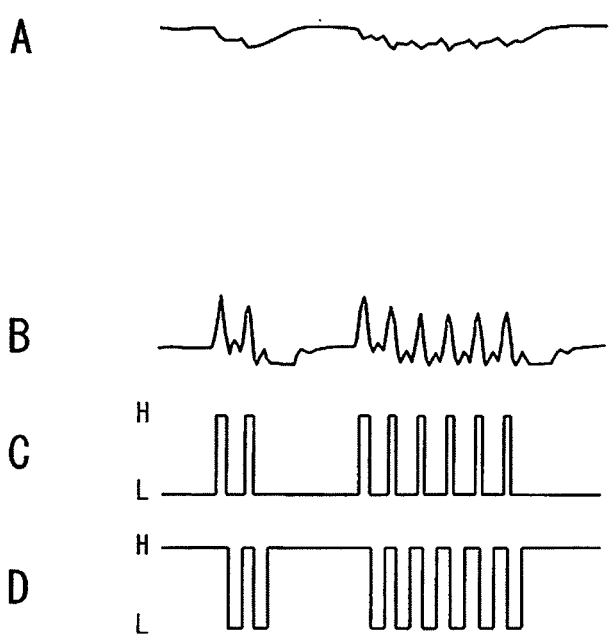
FIG. 22 is a waveform chart showing the operation example of the receiving circuit in embodiments 1 and 2.
Figure 23:
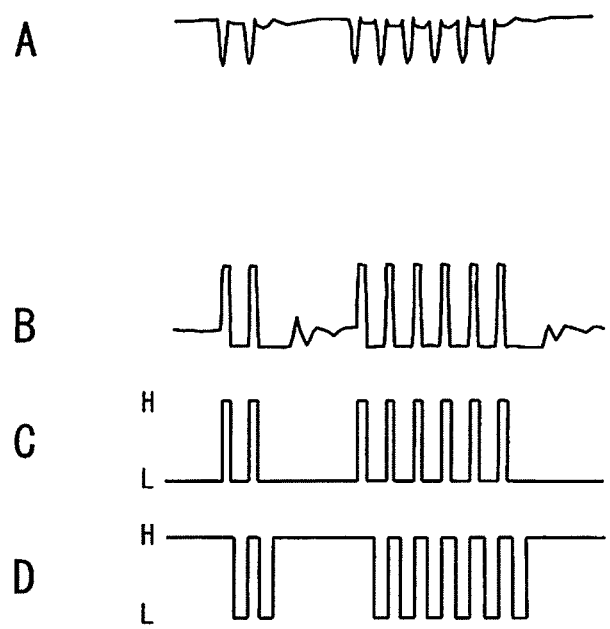
FIG. 23 is a waveform chart showing the operation example of the receiving circuit in embodiments 1 and 2.
Figure 24:
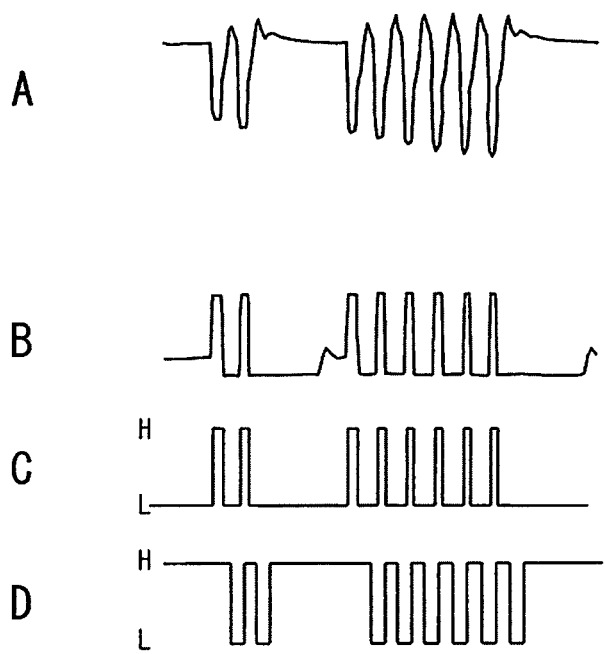
FIG. 24 is a waveform chart showing the operation example of the receiving circuit in embodiments 1 and 2.
Figure 25:
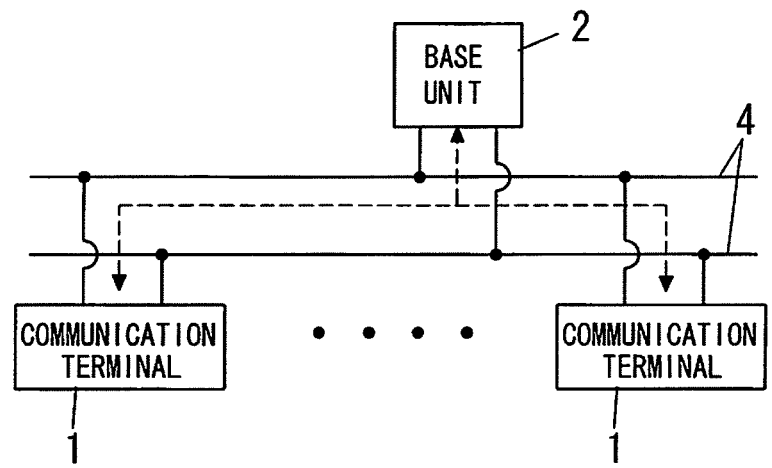
FIG. 25 is a schematic system block diagram showing a conventional example.

Further, the current/voltage converter 3 is not limited to have a structure composed of resistance elements R11, R12 inserted between the output end of the transmission unit 2 and the communication line 4 (see FIG. 3), but may have a structure composed of an impedance upper section using a transformer as shown in FIG. 20 for example.

In an example of FIG. 20, the current/voltage converter 3 includes secondary winding inductors (transformers) M1, M2 consisting of primary and secondary coils, and diodes D1 to D8, in addition to resistance elements R101, R102. The primary and secondary coils of the secondary winding inductors M1, M2 function as inductance elements respectively, and are utilized as resistance components of the current/voltage converter 3.

Specifically, in parallel to the resistance element R101 inserted to one of the two-wire communication lines 4, the series circuit of diodes D1, D5, and the series circuit of diodes D2, D6 are connected in reverse parallel to each other. In the secondary winding inductor M1, the primary coil is connected between both ends of diode D2, and the secondary coil is connected between both ends of diode D1.

Similarly, in parallel to the resistance element R102 inserted to the other of the two-wire communication lines 4, the series circuit of diodes D3, D7, and the series circuit of diodes D4, D8 are connected in reverse parallel to each other. In the secondary winding inductor M2, the primary coil is connected between both ends of diode D3, and the secondary coil is connected between both ends of diode D4.

According to this structure, by using inductances of the secondary winding inductors M1, M2, the current/voltage converter 3 shows low resistance to the DC current component, while showing sufficient resistive impedance to the signal component used for communication. Namely, when the resistance values of the resistance elements R101, R102 are set to 4.7Ω for example, the input impedance of the current/voltage converter 3 is about 10Ω in a frequency band of the signal component (for example 78 kHz) used for communication. Meanwhile, DC resistance of the current/voltage converter 3 is determined by a coil resistance (for example, about 2Ω) of the secondary winding inductors M1, M2, and therefore it becomes low resistance.

As a result, the DC resistance can be set to be small in the current/voltage converter 3 having the structure shown in FIG. 20, compared with that of the current/voltage converter 3 composed of resistance elements R11, R12 (see FIG. 3), while equalizing the impedance to the signal component. Therefore, there is an advantage that sufficient voltage can be applied to an end terminal, even if the current supplied from the transmission unit 2 is increased, thereby increasing the voltage drop in the current/voltage converter 3. For example, when the current of 500 mA flows with line resistance 16Ω of the communication line 4, the voltage drop of about 13 V occurs on the last end if the resistance of the current/voltage converter 3 is 10Ω. However, if the resistance of the current/voltage converter 3 is 2Ω, the voltage drop is suppressed to about 9 V even on the last end.

In addition, in the current/voltage converter 3 having the structure shown in FIG. 20, the current flows through a coil different in each polarity of the signal, out of the primary and secondary coils of the secondary winding inductors M1, M2, and therefore a counter-electromotive force is small when the polarity of the signal is inverted. Accordingly, there is an advantage that the distortion of the waveform generated on the communication line 4 when the polarity of the signal is inverted, can be suppressed while increasing the input impedance by the inductance element, and the deterioration of the communication quality can be suppressed.

Further, FIGS. 21 to 24 show the distance between the transmitting side communication terminal 10 and the receiving side communication terminal 10, and the waveform obtained in each section of the receiving side communication terminal 10 when the number of the communication terminals 10 connected to the communication line 4 is changed, in the structure of the aforementioned each embodiment. In FIGS. 21 to 24, "A" shows the secondary signal 52 received by the communication terminal 10, "B" shows the output of the amplifier circuit 21, "C" shows the output of the comparator circuit 22, and "D" shows the output (received data) of the correction circuit 23.

As is clarified from the FIGS. 21 to 24, in the communication system with the aforementioned structure, the receiving side communication terminal 10 can regularly receive the received data, even when the distance between the communication terminals 10 and the number of the communication terminals 10 are changed, and even when the distortion of the waveform and attenuation of the signal are generated in the secondary signal 52.

The invention claimed is:

1. A communication system comprising:
    a plurality of communication terminals connected to a two-wire communication line;
    a power supply that applies a voltage between two wires of the communication line; and
    a current/voltage converter that converts a current change on the communication line to a voltage change on the communication line by voltage drop by two resistance components,
    each of the plurality of communication terminals comprising:
    a transmitting circuit that is connected to the communication line and generates a primary current signal on the communication line, by changing a current flowing from the communication line; and
    a receiving circuit that receives a secondary signal, which is generated by converting the primary current signal to a voltage signal by the current/voltage converter,
    wherein the current/voltage converter comprises the two resistance components, each being positioned along one of the two wires, and connected in parallel.

2. The communication system according to claim 1, wherein a characteristic impedance of the communication line is utilized as each of the resistance components by the current/voltage converter.

3. The communication system according to claim 1, wherein each of the resistance components comprises a resistance element connected between the power supply and the communication line.

4. The communication system according to claim 1, wherein each of the resistance components comprises an inductance element connected between the power supply and the communication line.

5. The communication system according claim 1, wherein the receiving circuit receives, as the secondary signal, the voltage change which is generated on the communication line due to the voltage drop when the current flowing from the communication line is changed by the transmitting circuit.

6. The communication system according to claim 1, wherein
    the power supply comprises a signal transmitter that transmits a first protocol voltage signal to the communication line by changing a magnitude of a voltage applied to the communication line, and
    the receiving circuit receives, as the secondary signal, a secondary protocol signal having a higher frequency than a frequency of the first protocol voltage signal and superimposed on the first protocol voltage signal.

7. The communication system according to claim 1, wherein
    the receiving circuit comprises a comparator circuit that extracts a signal component of the secondary signal, by binarizing the secondary signal by comparing the magnitude of the secondary signal with a predetermined threshold value, and
    when transmitting the primary signal from the transmitting circuit, the communication terminal reduces an input impedance viewed from the communication line to suppress an amplitude of the secondary signal such that a component other than the signal component of the secondary signal does not exceed the threshold value.

8. The communication system according to claim 1, wherein the receiving circuit comprises:
    an amplifier circuit that converts the secondary signal to the voltage change from a first reference voltage, by amplifying the secondary signal; and
    a comparator circuit that binarizes the secondary signal, by comparing an output of the amplifier circuit with a secondary reference voltage, the first reference voltage being different from the second reference voltage.

9. The communication system according to claim 1, wherein the receiving circuit comprises:
    a comparator circuit that binarizes the secondary signal, by comparing a magnitude of the secondary signal with a predetermined threshold value; and
    a correction circuit that detects rising or falling of the secondary signal as a trigger, and corrects the secondary signal to a square wave having a predetermined pulse width from a detection point of the trigger.

10. The communication system according to claim 9, wherein the transmitting circuit includes an encoder that encodes transmission data such that a value that does not generate the trigger does not continue in the secondary signal, and
    the receiving circuit includes a decoder that decodes the encoded data obtained from the secondary signal to acquire the transmission data.

11. The communication system according to claim 1, wherein the plurality of communication terminals comprise a transmission side communication terminal and a receiving side communication terminal to communicate each other via the current/voltage converter,
    the current/voltage converter converts the current change based on the primary current signal generated by the transmitting circuit of the transmission side communication terminal, to the voltage change to generate the secondary signal, and
    the receiving circuit of the receiving side communication terminal receives the secondary signal generated by the current/voltage converter.

12. The communication system according to claim 1, wherein the current/voltage converter is configured to convert the primary current signal generated in the transmitting circuit into the secondary signal by voltage drop by the two resistance components, and transmit the secondary signal to the communication line.

* * * * *